(12) United States Patent
Oda et al.

(10) Patent No.: US 12,445,372 B2
(45) Date of Patent: Oct. 14, 2025

(54) COMMUNICATION SYSTEM, DISTRIBUTION DEVICE, DATA DISTRIBUTION METHOD AND PROGRAM

(71) Applicant: NTT, Inc., Tokyo (JP)

(72) Inventors: Takuya Oda, Musashino (JP); Takuya Ohara, Musashino (JP); Fumikazu Inuzuka, Musashino (JP); Takafumi Tanaka, Musashino (JP); Masayuki Shimoda, Musashino (JP)

(73) Assignee: NTT, Inc., Tokyo (JP)

( * ) Notice: Subject to any disclaimer, the term of this patent is extended or adjusted under 35 U.S.C. 154(b) by 212 days.

(21) Appl. No.: 18/028,042

(22) PCT Filed: Sep. 25, 2020

(86) PCT No.: PCT/JP2020/036303
§ 371 (c)(1),
(2) Date: Mar. 23, 2023

(87) PCT Pub. No.: WO2022/064640
PCT Pub. Date: Mar. 31, 2022

(65) Prior Publication Data
US 2023/0344753 A1    Oct. 26, 2023

(51) Int. Cl.
*H04L 45/30* (2022.01)
*H04L 12/50* (2006.01)
*H04L 12/54* (2022.01)

(52) U.S. Cl.
CPC .............. *H04L 45/30* (2013.01); *H04L 12/50* (2013.01); *H04L 12/56* (2013.01)

(58) Field of Classification Search
CPC .......... H04L 45/30; H04L 12/50; H04L 12/56
See application file for complete search history.

(56) References Cited

U.S. PATENT DOCUMENTS 6,678,524 B1 *   1/2004   Hansson ............... H04W 72/51
                                                        455/448
6,914,972 B1 *   7/2005   Baumeister ........... H04M 7/006
                                                        379/221.01
(Continued)

FOREIGN PATENT DOCUMENTS

EP          3041311        7/2016
JP        A-10-117215      5/1998
(Continued)

OTHER PUBLICATIONS

Aten International Co., Ltd., "KE6920 datasheet," ver. 01, Jun. 17, 2020, retrieved from URL <https://assets.aten.com/product/spec_sheet/JP/ke6920-6922_ver01j.pdf>, Aten Product Information KE6920, pp. 1-5 (No Translation).

(Continued)

*Primary Examiner* — Rasheed Gidado
(74) *Attorney, Agent, or Firm* — Fish & Richardson P.C.

(57) ABSTRACT

Distribution devices are each connected to a single or a plurality of line switching networks and a single or a plurality of packet switching networks, selects either the line switching network or the packet switching network as the distribution destination on the basis of distribution policy information in a case where data to which the service providing device or the calculation device is set as a transmission destination, and transmits the received data to the selected switching network is received, and the distribution device captures the received data on the basis of the aggregation policy information and transmit the data to the service providing device or the calculation device corresponding to the transmission destination of the captured data in a case where data transmitted by the other distribution device is received from the line switching network or the packet switching network.

7 Claims, 22 Drawing Sheets

(56) References Cited

U.S. PATENT DOCUMENTS

| | | | |
|---|---|---|---|
| 7,519,049 B2* | 4/2009 | Masuda | H04W 88/181 |
| | | | 455/414.4 |
| 7,822,065 B2 | 10/2010 | Lu | |
| 8,719,534 B1 | 5/2014 | Ray, III et al. | |
| 9,141,420 B2 | 9/2015 | Chang et al. | |
| 9,146,769 B1 | 9/2015 | Shankar et al. | |
| 9,785,478 B1 | 10/2017 | Babu et al. | |
| 11,089,105 B1 | 8/2021 | Karumbunathan et al. | |
| 11,301,407 B2 | 4/2022 | Sen et al. | |
| 2003/0184651 A1* | 10/2003 | Ohsawa | H04N 1/00312 |
| | | | 348/207.1 |
| 2006/0171713 A1 | 8/2006 | Feng | |
| 2007/0079307 A1 | 4/2007 | Dhawan et al. | |
| 2008/0235361 A1 | 9/2008 | Crosbie et al. | |
| 2009/0240790 A1 | 9/2009 | Utsunomiya et al. | |
| 2010/0042636 A1 | 2/2010 | Lu | |
| 2011/0126047 A1 | 5/2011 | Anderson et al. | |
| 2012/0117563 A1 | 5/2012 | Chang et al. | |
| 2012/0327953 A1 | 12/2012 | Vokkarane et al. | |
| 2013/0262390 A1 | 10/2013 | Kumarasamy et al. | |
| 2014/0019621 A1 | 1/2014 | Khan et al. | |
| 2014/0181984 A1 | 6/2014 | Kundu et al. | |
| 2014/0258533 A1 | 9/2014 | Antony | |
| 2015/0363219 A1 | 12/2015 | Katsuri et al. | |
| 2017/0235817 A1 | 8/2017 | Deodhar et al. | |
| 2018/0191601 A1 | 7/2018 | Micallef | |
| 2019/0042325 A1 | 2/2019 | Nair | |
| 2019/0327144 A1 | 10/2019 | Tembey et al. | |
| 2019/0339320 A1 | 11/2019 | Dzafic | |
| 2020/0218684 A1 | 7/2020 | Sen et al. | |
| 2020/0412657 A1 | 12/2020 | Jang et al. | |
| 2022/0158756 A1 | 5/2022 | Wang et al. | |

FOREIGN PATENT DOCUMENTS

| | | |
|---|---|---|
| JP | A-2003-535526 | 11/2003 |
| JP | A-2005-064970 | 3/2005 |
| JP | A-2006-527541 | 11/2006 |
| JP | A-2010-521761 | 6/2010 |
| JP | A-2012-505561 | 3/2012 |
| JP | A-2015-065527 | 4/2015 |
| JP | A-2015-527649 | 9/2015 |
| KR | 10-2014-0003200 A | 1/2014 |
| WO | WO 01/93607 A1 | 12/2001 |
| WO | WO 2004/111775 A2 | 12/2004 |
| WO | WO 2010/041582 A1 | 4/2010 |
| WO | WO 2015/029416 | 3/2015 |
| WO | WO 2020/143380 | 7/2020 |

OTHER PUBLICATIONS

Bijoy Chand Chatterjee et al., "Routing and Wavelength Assignment for WDM-based Optical Networks," Springer, pp. 35-43, vol. 410, 2017.

International Search Report in International Appln. No. PCT/JP2020/036303, dated Feb. 2, 2021, 6 pages (with English Translation).

International Search Report in International Appln. No. PCT/JP2020/039655, dated Feb. 16, 2021, 6 pages (with English Translation).

K. Yamaguchi et al., "M×N Wavelength Selective Switches Using Beam Splitting By Space Light Modulators," IEEE Photonics Journal, vol. 8, No. 1, Feb. 2016.

M. Jinno et al., "An Overview of Elastic Optical Networks," Proceedings of the 2013 IEICE Communications Society Conference, 2013, p. SS-98-SS-99 (No Translation).

Pegah Afsharlar et al., "Routing and Spectrum Assignment with Delayed Allocation in Elastic Optical Networks," Journal of Optical Communications and Networking, 2017, pp. 1-10.

R. A. Wagner and S. E. Dreyfus, "The Steiner Problem in Graphs," Networks 1, Dreyfus and Wagner, pp. 195-207, 1972.

Ramesh Govindan et al., "An Architecture for Stable, Analyzable Internet Routing," IEEE Network, vol. 13, issue 1, pp. 29-35, 1999.

Ryan Shea and Jiangchuan Liu, "Cloud Gaming: Architecture and Performance," IEEE Network, Jul./Aug. 2013, IEEE 2013, pp. 16-21.

Takamichi Nishijima et al., "On the Impact of Network Environment on Remote Desktop Protocols," IEICE Technical Report CQ2012-21 (Jul. 2012), 2012, pp. 23-28 (English Abstract).

Wei Lu et al., "Dynamic Service Provisioning of Advance Reservation Requests in Elastic Optical Networks," Journal of Lightwave Technology, vol. 31, Issue. 10, 2013, pp. 1621-1627.

Y. Liu et al., "The Degree-Constrained Multicasting Algorithm Using Ant Algorithm," Proceedings of the 10th International Conference on Telecommunications, 2003, pp. 370-374.

Yang Chen et al., "Optical Burst Switching: A New Area in Optical Networking Research," IEEE Network, vol. 18, issue 3, pp. 16-23, 2004.

Jinno et al., "Virtualization in Optical Networks from Network Level to Hardware Level [Invited]," J. Opt. Commun. Netw., Oct. 2013, 5(10):A46-A56.

* cited by examiner (a)

70 DISTRIBUTION POLICY TABLE

| DISTRIBUTION POLICY | SELECTED STATE |
|---|---|
| TIME DIVISION TRANSMISSION | × |
| INFORMATION TYPE TRANSMISSION | ○ |

(b)

71 TIME DIVISION TRANSMISSION TABLE

| TRANSMISSION TIME | SWITCHING NETWORK TYPE | OUTPUT DESTINATION | TRANSMISSION DESTINATION INFORMATION | LINE IDENTIFICATION INFORMATION |
|---|---|---|---|---|
| 0 TO 29 SECONDS PER MINUTE | LINE SWITCHING NETWORK | DATA OUTPUT UNIT A | — | — |
| 30 TO 59 SECONDS PER MINUTE | PACKET SWITCHING NETWORK | DATA OUTPUT UNIT B | — | — |

(c)

72 INFORMATION TYPE TRANSMISSION TABLE

| PROTOCOL TYPE | SWITCHING NETWORK TYPE | OUTPUT DESTINATION | TRANSMISSION DESTINATION INFORMATION | LINE IDENTIFICATION INFORMATION |
|---|---|---|---|---|
| ftp | LINE SWITCHING NETWORK | DATA OUTPUT UNIT A | — | — |
| http | PACKET SWITCHING NETWORK | DATA OUTPUT UNIT B | — | — |

80 AGGREGATION POLICY TABLE

| AGGREGATION POLICY | SELECTED STATE |
|---|---|
| TIME DIVISION RECEPTION | × |
| SIMULTANEOUS RECEPTION | × |
| SELECTIVE RECEPTION | ○ |

(b)

81 TIME DIVISION RECEPTION TABLE

| RECEPTION TIME | SWITCHING NETWORK TYPE | CAPTURING SOURCE |
|---|---|---|
| 0 TO 29 SECONDS PER MINUTE | LINE SWITCHING NETWORK | DATA CAPTURING UNIT A |
| 30 TO 59 SECONDS PER MINUTE | PACKET SWITCHING NETWORK | DATA CAPTURING UNIT B |

(c)

82 SIMULTANEOUS RECEPTION TABLE

| SWITCHING NETWORK TYPE | CAPTURING SOURCE |
|---|---|
| LINE SWITCHING NETWORK | DATA CAPTURING UNIT A |
| PACKET SWITCHING NETWORK | DATA CAPTURING UNIT B |

(d)

83 SELECTIVE RECEPTION TABLE

| PRIORITY | SWITCHING NETWORK TYPE | CAPTURING SOURCE |
|---|---|---|
| HIGH | LINE SWITCHING NETWORK | DATA CAPTURING UNIT A |
| LOW | PACKET SWITCHING NETWORK | DATA CAPTURING UNIT B |

| PROTOCOL TYPE | SWITCHING NETWORK TYPE | OUTPUT DESTINATION | TRANSMISSION DESTINATION INFORMATION | LINE IDENTIFICATION INFORMATION |
|---|---|---|---|---|
| ftp | LINE SWITCHING NETWORK | DATA OUTPUT UNIT A | — | 000001 |
| http | PACKET SWITCHING NETWORK | DATA OUTPUT UNIT B | (TRANSMISSION DESTINATION ADDRESS) | — |

72b

| INFORMATION TYPE TRANSMISSION TABLE | SELECTION CONDITION | LOW USAGE RATE | | |
|---|---|---|---|---|
| PROTOCOL TYPE | SWITCHING NETWORK TYPE | OUTPUT DESTINATION | TRANSMISSION DESTINATION INFORMATION | LINE IDENTIFICATION INFORMATION |
| ftp | LINE SWITCHING NETWORK | DATA OUTPUT UNIT A | — | — |
| http | PACKET SWITCHING NETWORK A | DATA OUTPUT UNIT B | — | — |
| | PACKET SWITCHING NETWORK B | DATA OUTPUT UNIT C | — | — |

| SIMULTANEOUS RECEPTION TABLE | |
|---|---|
| SWITCHING NETWORK TYPE | CAPTURING SOURCE |
| LINE SWITCHING NETWORK | DATA CAPTURING UNIT A |
| PACKET SWITCHING NETWORK A | DATA CAPTURING UNIT B |
| PACKET SWITCHING NETWORK B | DATA CAPTURING UNIT C |

| USAGE RATE TABLE | |
|---|---|
| OUTPUT DESTINATION | USAGE RATE |
| DATA OUTPUT UNIT B | 90% |
| DATA OUTPUT UNIT C | 50% |

FIG. 17

| CHARGE TYPE TABLE | |
|---|---|
| OUTPUT DESTINATION | CHARGE |
| DATA OUTPUT UNIT A | 5000 YEN/ONE MEGA BIT |
| DATA OUTPUT UNIT B | 1000 YEN/ONE MEGA BIT |
| DATA OUTPUT UNIT C | 3000 YEN/ONE MEGA BIT |

COMMUNICATION SYSTEM, DISTRIBUTION DEVICE, DATA DISTRIBUTION METHOD AND PROGRAM

CROSS-REFERENCE TO RELATED APPLICATIONS

This application is a National Stage application under 35 U.S.C. § 371 of International Application No. PCT/JP2020/036303, having an International Filing Date of Sep. 25, 2020, the disclosure of which is considered part of the disclosure of this application, and is incorporated by reference in its entirety into this application.

TECHNICAL FIELD

The present invention relates to a communication system, a distribution device, a data distribution method and a program.

BACKGROUND ART

FIG. 24 is a block diagram illustrating a schematic configuration of a general communication system 200. In the communication system 200, a packet switching network 210 is configured, for example, by connecting packet switching devices 211-1 to 211-4 such as routers. The Internet is a communication network configured by connecting a plurality of such packet switching networks 210, and here, it is assumed that the packet switching network 210 conceptually indicates the entire Internet or a part of the Internet (see, for example, Non Patent Literature 1).

A packet switching network management device 213 is a device that performs processing of constructing and monitoring a state of the packet switching network 210. Service providing devices 201-1 to 201-3 are, for example, server devices connected to the Internet or the like, and provide a service for storing files, a service of e-mail, or the like.

For example, in a case where a user at a user's home 230-1 uses a service provided by the service providing device 201-1, the user accesses the service providing device 201-1 installed in a place different from the user's home by using the calculation device 240-1 that is a personal computer, a game machine, or the like installed in the user's home 230-1. Upon receiving an operation of the user via an input/output device 242-1, a main device 241-1 included in the calculation device 240-1 transmits data whose transmission destination is the service providing device 201-1 to the packet switching device 211-2 via an access network 220-1. Here, the main device 241-1 is a device including an arithmetic unit such as a central processing unit (CPU), a storage unit such as a memory, and a communication unit that performs communication. The input/output device 242-1 is a device including an input unit such as a keyboard and a mouse and an output unit such as a display.

Upon receiving the data whose transmission destination is the service providing device 201-1, the packet switching device 211-2 converts the received data into a plurality of packets whose transmission destination is the service providing device 201-1. The packet switching device 211-2 transfers the plurality of converted packets to the packet switching device 211-1 to which the service providing device 201-1 is connected according to the route information. Upon receiving the plurality of packets whose transmission destination is the service providing device 201-1, the packet switching device 211-1 restores original data from the received plurality of packets and transmits the restored data to the service providing device 201-1. Upon receiving the data from the packet switching device 211-1, the service providing device 201-1 starts transmitting data related to the service to be provided to the calculation device 240-1.

FIG. 25 is a diagram illustrating a connection configuration between the user's calculation device 240-1 and the service providing device 201-1. Data transmitted by the main device 241-1 of the calculation device 240-1 is received by an access transmission device 221-2 in the access network 220-1. The data received by the access transmission device 221-2 is transferred to an access transmission device 221-1 through an optical path set between an optical transmission device 223-2 and an optical transmission device 223-1.

In the packet switching network 210, the packet switching device 211-2 receives data transmitted by the access transmission device 221-1, and converts the received data into a plurality of packets. The packet switching device 211-2 transfers the plurality of packets to a packet switching device 211-1 through an optical path set between an optical transmission device 212-2 and an optical transmission device 212-1. Upon receiving a plurality of packets, the packet switching device 211-1 restores original data from the plurality of packets and transmits the restored data to the service providing device 201-1. In a case where the service providing device 201-1 transmits data to the calculation device 240-1, the data is transferred in the reverse order to the above.

Note that, in a case where the main device 241-1 or the service providing device 201-1 transmits and receives data in units of packets transferred in the packet switching network 210, the packet switching device 211-1 and 211-2 do not need to perform conversion from data to a packet or restoration of data from a packet. The packet switching device 211-1 and 211-2 transfer the packet received from the main device 241-1 or the service providing device 201-1 as it is, and transmits the transferred packet to the main device 241-1 or the service providing device 201-1 as it is.

Except in exceptional cases, when a general mass user uses a service on the Internet, communication using the packet switching network 210 is performed regardless of a form of communication such as wired communication or wireless communication. Data transmitted and received by mass users includes from a small amount of data of about several kilobytes such as an electronic mail to a large amount of data exceeding several hundred gigabytes. Such data of various capacities is transmitted and received via the common packet switching network 210.

As described above, the communication system 200 includes only the packet switching network 210 in which data of various capacities is transmitted and received, and adjustment of a communication capacity to be allocated to communication of a large amount of data, communication of audio or video requiring a fixed band, and the like is performed by, for example, priority control of packets.

CITATION LIST

Non Patent Literature

Non Patent Literature 1: Ramesh Govindan, et al., "An Architecture for Stable, Analyzable Internet Routing", IEEE Network, volume 13, issue 1, pp. 29-35, 1999

Non Patent Literature 2: Yang Chen, et al., "Optical Burst Switching: A New Area in Optical Networking Research", IEEE Network, volume 18, issue 3, pp. 16-23, 2004

SUMMARY OF INVENTION

Technical Problem

In recent years, with the spread of gaming and software subscription, opportunities for downloading or uploading a large amount of data are increasing. Thus, in the packet switching network 210, there are increasing opportunities for transmission and reception of a large amount of data, and there is a problem that it becomes difficult to adjust the communication capacity by the above-described priority control of packets.

In the packet switching network 210, by the increase of opportunities for transmission and reception of a large amount of data, the available communication capacity for each user decreases. Thus, there is a problem that it may take several hours to download a large amount of data of about 100 gigabytes. Various data transfer services and protocols through the Internet have been provided so far, and, for example, studies on an optical burst transfer technology for individually allocating a large-capacity optical path and temporarily implementing large-capacity transfer have also been conducted (see, for example, Non Patent Literature 2). However, even if such a technology is used, only some users who can use the technology can benefit from the technology, and not all users who use the packet switching network 210 can obtain a desired communication capacity.

In view of the above circumstances, an object of the present invention is to provide a technique capable of easily securing a desired communication capacity in a communication system including a packet switching network.

Solution to Problem

One aspect of the present invention is a communication system including a service providing device that provides a service to a user, a calculation device having at least a communication function and an arithmetic processing function, and a plurality of distribution devices connected to a single or a plurality of line switching networks that transfers data received through a line generated corresponding to a transmission destination of data and a single or a plurality of packet switching networks that transfers data through a route corresponding to the transmission destination of data among a plurality of routes, each of the distribution devices selecting one of the line switching network or the packet switching network as a distribution destination on the basis of distribution policy information in a case where data to which the service providing device or the calculation device is set as a transmission destination is received, transmitting the received data to the selected switching network, capturing the received data on the basis of aggregation policy information in a case where the data transmitted by another one of the distribution devices is received from the line switching network or the packet switching network, and transmitting the captured data to the service providing device or the calculation device corresponding to a transmission destination of the captured data.

One aspect of the present invention is a distribution device provided in a communication system that includes a single or a plurality of line switching networks that transfers data received through a line generated corresponding to a transmission destination of data and a single or a plurality of packet switching networks that transfers data through a route corresponding to the transmission destination of data among a plurality of routes, a service providing device that provides a service to a user, and a calculation device having at least a communication function and an arithmetic processing function, in which the distribution device selects one of the line switching network or the packet switching network as a distribution destination on the basis of distribution policy information in a case of connecting to the line switching network and the packet switching network and receiving data to which the service providing device or the calculation device is set as a transmission destination, transmits the received data to the selected switching network, captures the received data on the basis of aggregation policy information in a case where the data transmitted by another one of the distribution devices is received from the line switching network or the packet switching network, and transmits the captured data to the service providing device or the calculation device corresponding to a transmission destination of the captured data.

One aspect of the present invention is a data distribution method including, by a first distribution device, in a case of receiving data to which a service providing device that provides a service to a user or a calculation device having at least a communication function and an arithmetic processing function is set as a transmission destination, selecting, as a distribution destination, a single or a plurality of line switching networks or a single or a plurality of packet switching networks on the basis of distribution policy information, and transmitting the received data to the selected switching network, transferring, in a case where the data is received from the first distribution device in the line switching network, the received data through a line generated corresponding to the transmission destination of the data, transferring, in a case where the data is received from the first distribution device in the packet switching network, the received data through a route corresponding to the transmission destination of the data among a plurality of routes, and by a second distribution device, in a case of receiving the data transmitted by the first distribution device from the line switching network or the packet switching network, capturing the received data on the basis of aggregation policy information, and transmitting the captured data to the service providing device or the calculation device corresponding to the transmission destination of the captured data.

One aspect of the present invention is a program for causing a computer that operates as a distribution device connected to a single or a plurality of line switching networks that transfers data received through a line generated corresponding to a transmission destination of data and a single or a plurality of packet switching networks that transfers data through a route corresponding to the transmission destination of data among a plurality of routes, to execute a procedure, in a case where data to which a service providing device that provides a service to a user or a calculation device having at least a communication function and an arithmetic processing function is set as a transmission destination is received, of selecting one of the line switching network or the packet switching network as a distribution destination on the basis of distribution policy information, and transmitting the received data to the selected switching network, and a procedure of capturing the received data on the basis of aggregation policy information in a case where the data transmitted by a computer operating as another one of the distribution devices is received from the line switching network or the packet switching network, and transmitting the captured data to the service providing device or the calculation device corresponding to a transmission destination of the captured data.

Advantageous Effects of Invention

According to the present invention, it is possible to easily secure a desired communication capacity in a communication system including a packet switching network.

BRIEF DESCRIPTION OF DRAWINGS

FIG. 4 is a diagram illustrating a data configuration of a table related to distribution policy stored in a distribution policy-aggregation policy information storage unit of the distribution device of the first embodiment.

FIG. 5 is a diagram illustrating a data configuration of a table related to aggregation policy stored in the distribution policy-aggregation policy information storage unit of the distribution device of the first embodiment.

FIG. 9 is a diagram illustrating an example of a storage state of an internal storage area of a data distribution unit of the distribution device of the first embodiment.

FIG. 15 is a diagram illustrating a data configuration of an information type transmission table stored in a distribution policy-aggregation policy information storage unit of the distribution device of the third embodiment.

FIG. 16 is a diagram illustrating a data configuration of a simultaneous reception table stored in the distribution policy-aggregation policy information storage unit of the third embodiment.

FIG. 17 is a diagram illustrating a data configuration of a usage rate table stored in a comparison information storage unit of the distribution device of the third embodiment.

DESCRIPTION OF EMBODIMENTS

First Embodiment

Figure 1:
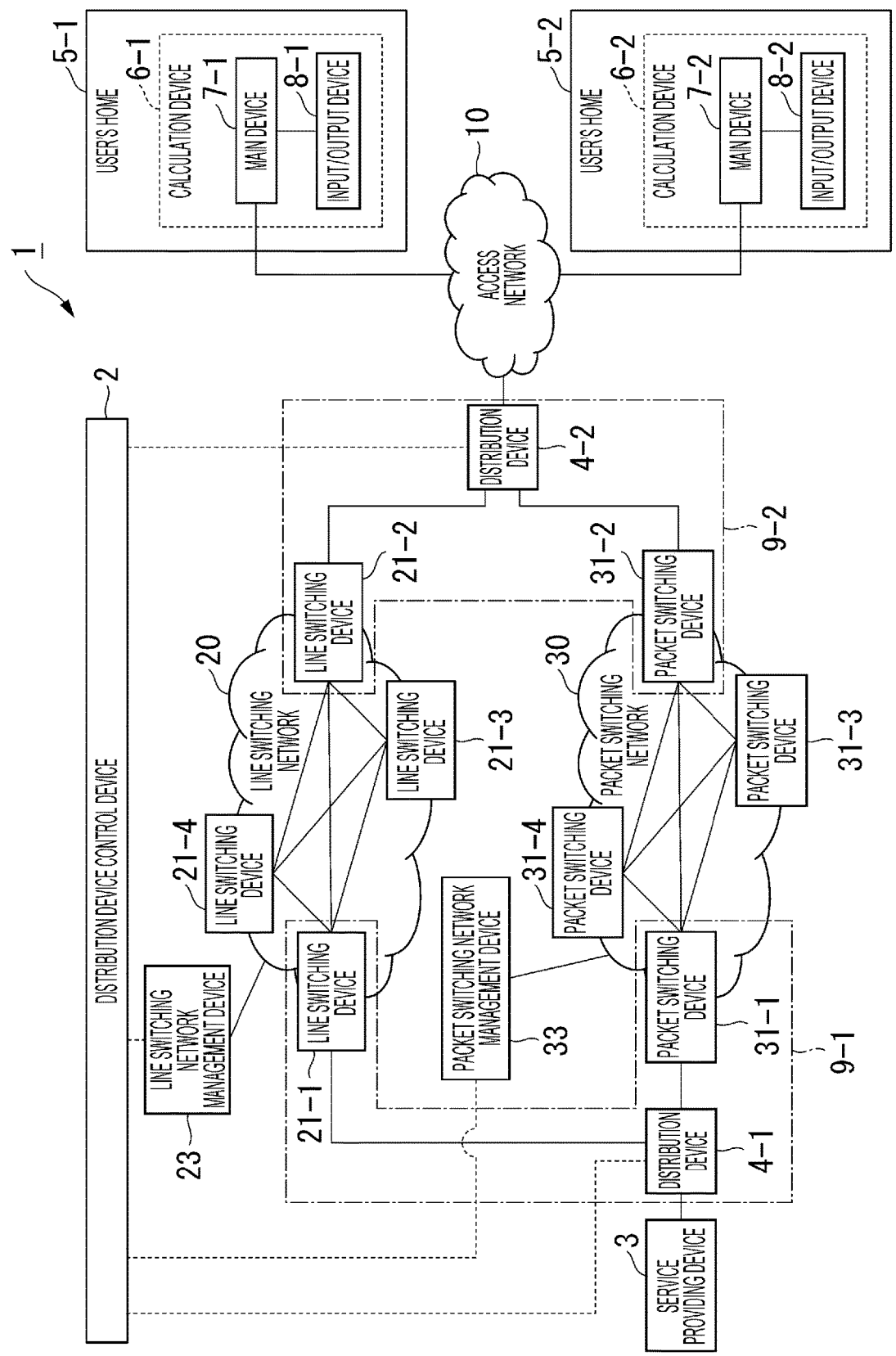
FIG. 1 is a block diagram illustrating a configuration of a communication system of a first embodiment.

Hereinafter, an embodiment of the present invention will be described with reference to the drawings. FIG. 1 is a block diagram illustrating a configuration of a communication system 1 according to a first embodiment. The communication system 1 includes a distribution device control device 2, a service providing device 3, distribution devices 4-1 and 4-2, calculation devices 6-1 and 6-2, an access network 10, a line switching network 20, and a packet switching network 30. The calculation devices 6-1 and 6-2 are installed in user's homes 5-1 and 5-2.

Figure 2:
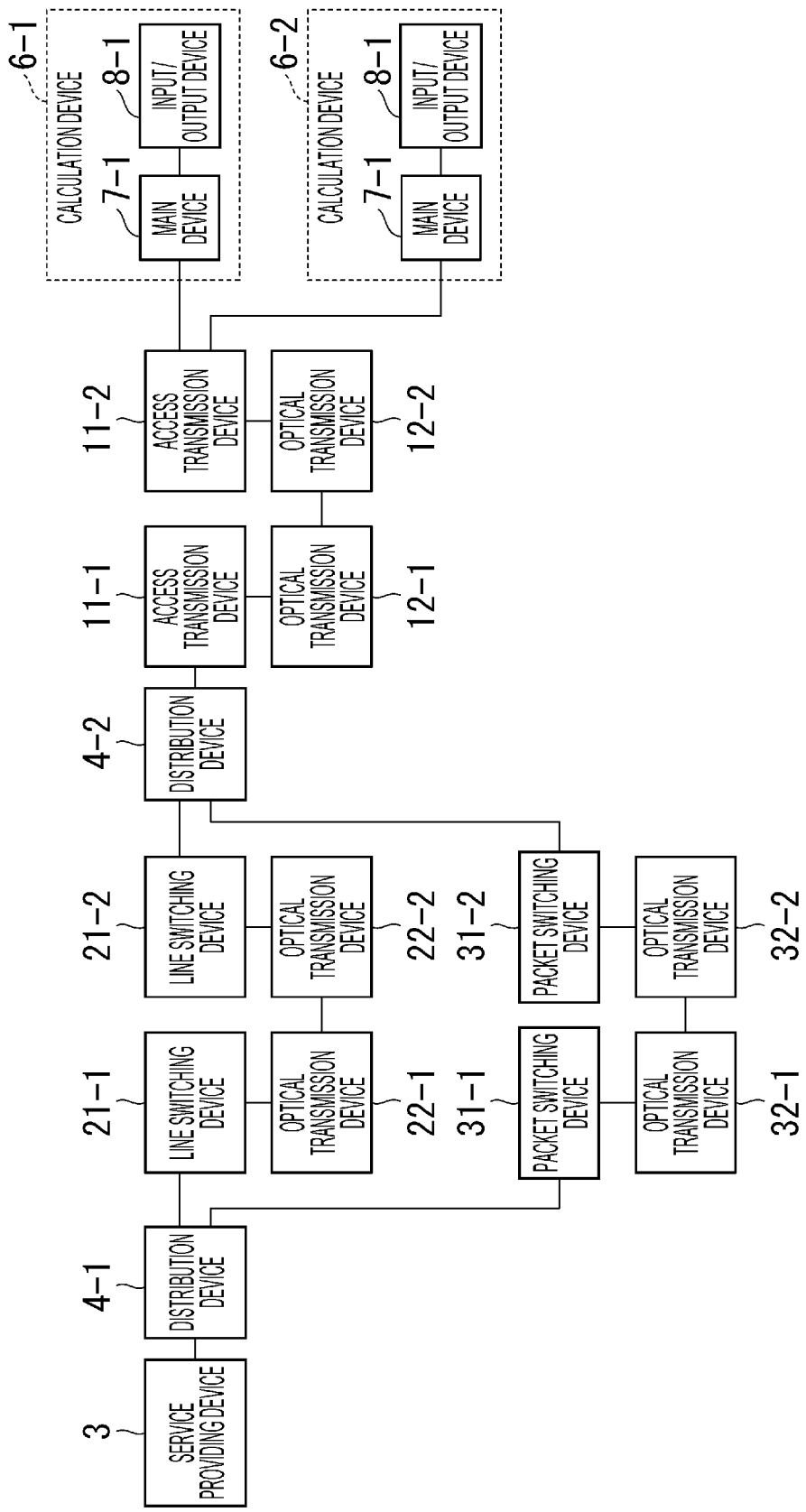
FIG. 2 is a block diagram illustrating a connection configuration of the communication system of the first embodiment.

The packet switching network 30 includes packet switching devices 31-1 to 31-4 and a packet switching network management device 33. More specifically, as illustrated in FIG. 2, the packet switching network 30 includes optical transmission devices such as optical transmission devices 32-1 and 32-2 connected to the packet switching devices 31-1 and 31-2. In each of the packet switching devices 31-3 and 31-4, similarly, an optical transmission device having the same configuration as the optical transmission devices 32-1 and 32-2 is connected. The optical transmission devices such as the optical transmission devices 32-1 and 32-2 and so on connected respectively to the packet switching devices 31-1 to 31-4 are connected by optical fibers. By setting an optical path between optical transmission devices such as the optical transmission devices 32-1 and 32-2, the packet switching devices 31-1 to 31-4 are connected via the optical path.

Note that the configuration of the packet switching network 30 illustrated in FIG. 1 is an example, and the packet switching network 30 may include a plurality of four or more packet switching devices 31-1 to 31-4. The packet switching network 30 may include a packet switching device for relay that is connected only to another packet switching device and performs only packet relay, in addition to the packet switching device installed at the end of the packet switching network 30, such as the packet switching devices 31-1 to 31-4.

The packet switching network management device 33 stores in advance information regarding optical transmission devices such as the packet switching devices 31-1 to 31-4 and the optical transmission devices 32-1 to 32-2 provided in the packet switching network 30. The information stored in advance by the packet switching network management device 33 also includes packet switching device identification information added in advance to each of the packet switching devices 31-1 to 31-4. The packet switching network management device 33 stores route information set in each of the packet switching devices 31-1 to 31-4. The packet switching network management device 33 performs processing of monitoring the construction or the state of the packet switching network 30 and collects, for example, information such as a usage rate indicating a ratio of a communication capacity in use to the entire communication capacity of the packet switching network 30. Here, the construction of the packet switching network 30 is to set routing, segment management, and the like among the packet switching devices 31-1 to 31-4, and includes construction of an optical transmission network configured by the optical transmission devices such as the optical transmission devices 32-1 to 32-2.

In the packet switching network 30, upon receiving data to which information indicating a transmission destination is added from an external device connected through an electric line or an optical line, the packet switching devices 31-1 to 31-4 installed at terminals divide the data into packets of a certain size. Each of the divided packets includes information indicating a transmission destination, and each of the packet switching devices 31-1 to 31-4 transfers the packet to the other packet switching devices 31-1 to 31-4 connected to the own device on the basis of information indicating the transmission destination of the packet and the route information defined in each of the packet switching devices 31-1 to 31-4. By being transferred by the packet switching devices 31-1 to 31-4, each of the packets is transferred to the packet switching devices 31-1 to 31-4 to which the transmission destination device is directly or indirectly connected.

As described above, in the packet switching network 30, since transmission can be performed in units of packets, a plurality of users can share and use lines that are resources. Since the transfer is performed according to the route information defined in each of the packet switching devices 31-1 to 31-4, it is not necessary to perform individual route design for each packet.

Note that the optical path set between the optical transmission devices such as the optical transmission devices 32-1 and 32-2 is generally statically set in advance. However, the optical path may be dynamically generated as in the line switching network 20 and the like described below, and each of the packet switching devices 31-1 to 31-4 may dynamically generate and connect a line using a communication network of a line switching method like the line switching network 20. However, these are merely systems of generation of lines performed in the lower layer, and when viewed from the upper layer side, that is, from the user side, transmission and reception are performed in units of packets in any of statically existing lines and dynamically generated lines, and the dynamically generated lines are not allocated to individual users. Therefore, a communication network in which lines are dynamically generated in the lower layer as described above is also included in the concept of the packet switching network 30.

The line switching network 20 includes line switching devices 21-1 to 21-4 and a line switching network management device 23. More specifically, as illustrated in FIG. 2, the line switching network 20 includes optical transmission devices such as optical transmission devices 22-1 and 22-2 connected to the line switching devices 21-1 and 21-2. Similarly, in each of the line switching devices 21-3 and 21-4, an optical transmission device having the same configuration as the optical transmission devices 22-1 and 22-2 is connected. The optical transmission devices such as the optical transmission devices 22-1 and 22-2 connected to the line switching devices 21-1 to 21-4 are connected by optical fibers.

The line switching method is a method in which a dedicated physical or logical resource is secured, that is, an individual line is generated between devices that transmit and receive data, and data is transmitted and received only in the generated individual line. For example, it is assumed that the line switching device 21-1 installed at the end of the line switching network 20 receives a request for transmitting data from an external device connected through an electric line or an optical line to a device directly or indirectly connected to the line switching device 21-2. In this case, the line switching devices 21-1 and 21-2 and the optical transmission devices 22-1 and 22-2 generate an individual line connecting the line switching device 21-1 and the line switching device 21-2, that is, optical paths in units of wavelengths divided by frequency slots.

In order to transmit and receive data between the line switching device 21-1 and the line switching device 21-2 as described above, it is necessary to generate the individual line. Unless the individual line is generated, data cannot be transmitted and received between the line switching device 21-1 and the line switching device 21-2. Although lines can be generated among all the line switching devices 21-1 to 21-4 in advance, it is a waste of resources to leave unused lines as they are. Thus, in the line switching network 20, the individual line is generated every time a data transmission request is received. When the individual line is generated, processing of housing design of calculating whether a resource for housing the individual line can be secured is performed.

Note that the configuration of the line switching network 20 illustrated in FIG. 1 is an example, and the line switching network 20 may include four or more line switching devices 21-1 to 21-4. The line switching network 20 may include a line switching device for relay that only relays lines, in addition to the line switching devices installed at the ends of the line switching network 20, such as the line switching devices 21-1 to 21-4. In a case where such a line switching device for relay is provided, when an individual line is generated between the line switching device 21-1 and the line switching device 21-2, the individual line may be directly generated between the line switching device 21-1 and the line switching device 21-2, or a line may be generated between the line switching device 21-1 and the line switching device for relay, a line may be further generated between the line switching device for relay and the line switching device 21-2, and an individual line may be generated by connecting two lines in the line switching device for relay. Which connection configuration is to be employed depends on the availability of resources and the result of the processing of housing design.

The line switching network management device 23 stores in advance information regarding the line switching devices 21-1 to 21-4 and the optical transmission devices 22-1 to 22-2 provided in the line switching network 20. The information stored in advance in the line switching network management device 23 also includes line switching device identification information added in advance to each of the line switching devices 21-1 to 21-4. The line switching network management device 23 stores in advance information that associates information indicating a plurality of transmission destinations with line switching device identification information of the line switching devices 21-1 to 21-4 respectively corresponding to the plurality of transmission destinations. The line switching network management device 23 performs processing of monitoring the state of the line switching network 20, for example, collecting information such as a usage rate indicating the ratio of a communication capacity in use to a total communication capacity of the line switching network 20. The line switching network management device 23 performs the above-described processing of housing design, processing of requesting the line switching devices 21-1 to 21-4 to generate a line, processing of adding line identification information to the generated line, and the like, and stores information regarding the generated line.

Note that the line switching network 20 and the packet switching network 30 illustrated in FIG. 1 are communication networks corresponding to a core network, which is a generic name for communication networks including a metro network and a core network.

The service providing device 3 provides a service to a user. The service providing device 3 provides, for example, a service for storing a file, a service of electronic mail, and the like. The service providing device 3 is, for example, a server device connected to the Internet or the like.

Each of the calculation devices 6-1 and 6-2 includes main devices 7-1 and 7-2 and input/output devices 8-1 and 8-2. The calculation devices 6-1 and 6-2 are, for example, personal computers or game devices. The main devices 7-1 and 7-2 are devices including an arithmetic unit such as a CPU, a storage unit such as a memory, and a communication unit that performs communication. The input/output devices 8-1 and 8-2 are devices including an input unit such as a keyboard and a mouse and an output unit such as a display.

The access network 10 is, for example, a communication network that connects a communication device installed in a station building of a communication station of a communication carrier and a communication device installed in a house or an office building, and connects, as illustrated in FIG. 1, the distribution device 4-2 installed in a station building 9-2 (hereinafter referred to as "base 9-2") of the communication station of the communication carrier indicated by a frame of a one-dot chain line and the main devices 7-1 and 7-2 of the calculation devices 6-1 and 6-2 installed in the user's homes 5-1 and 5-2.

As illustrated in FIG. 2, the access network 10 includes access transmission devices 11-1 and 11-2 and optical transmission devices 12-1 and 12-2. Each of the optical transmission devices 12-1 and 12-2 is connected to each of the access transmission devices 11-1 and 11-2, and the access transmission device 11-1 and the access transmission device 11-2 are connected by an optical path set between the optical transmission devices 12-1 and 12-2. Thus, the main devices 7-1 and 7-2 connected to the access transmission device 11-2 and the distribution device 4-2 are connected.

The distribution device control device 2 is connected to the distribution devices 4-1 and 4-2, the line switching network management device 23, and the packet switching network management device 33 through control lines indicated by broken lines. The distribution device control device 2 performs processing and the like of providing information specifying distribution destinations required during processing performed by the distribution devices 4-1 and 4-2, for example, processing by the distribution devices 4-1 and 4-2 to distribute and transfer data to the line switching network 20 or the packet switching network 30.

The distribution device 4-1 is installed in a station building 9-1 (hereinafter referred to as "base 9-1") of a communication station of the communication carrier indicated by a frame of a one-dot chain line, and is connected to the line switching device 21-1 installed in the base 9-1 and the packet switching device 31-1. The distribution device 4-2 is installed in the base 9-2 different from the base 9-1, and is connected to the line switching device 21-2 and the packet switching device 31-2 installed in the base 9-2. The distribution device 4-1 is connected to the service providing device 3, and the distribution device 4-2 is connected to the main devices 7-1 and 7-2 via the access network 10. Therefore, a connection configuration from the service providing device 3 to the calculation devices 6-1 and 6-2 is as illustrated in FIG. 2.

As can be seen from FIG. 2, for example, in a case where the service providing device 3 transmits data to be transmitted to the calculation devices 6-1 and 6-2, the distribution device 4-1 that has received the data transmitted by the service providing device 3 can transmit the data using either one or both of a route for transferring via the line switching network 20 and a route for transferring via the packet switching network 30.

Note that, although FIG. 2 illustrates the configuration in which the line switching device 21-1 and the line switching device 21-2 are connected via the optical transmission devices 22-1 and 22-2 in the line switching network 20, there are also cases where one or a plurality of other optical transmission devices is connected between the optical transmission devices 22-1 and 22-2, and the line switching device 21-1 and the line switching device 21-2 may be connected via three or more optical transmission devices. Further, in a case where the line switching device for relay that performs only relay as described above exists, a connection configuration from the line switching device 21-1 to the line switching device 21-2 via the line switching device for relay may be formed. Although FIG. 2 illustrates the configuration in which the packet switching device 31-1 and the packet switching device 31-2 are connected via the optical transmission devices 32-1 and 32-2 in the packet switching network 30, there are cases where one or a plurality of other optical transmission devices is connected between the optical transmission devices 32-1 and 32-2, and the packet switching device 31-1 and the packet switching device 31-2 are connected via three or more optical transmission devices. Further, depending on the setting of the route, a connection configuration from the packet switching device 31-1 to the packet switching device 31-2 via one or both of the packet switching devices 31-3 and 31-4 may be formed. In a case where the packet switching device for relay that performs only relay as described above exists, a connection configuration from the packet switching device 31-1 to the packet switching device 31-2 via the packet switching device for relay may be formed depending on the setting of the route.

The distribution devices 4-1 and 4-2 have the same configuration, and hereinafter, the distribution devices 4-1 and 4-2 are referred to as a distribution device 4, and an internal configuration of the distribution device 4 will be described with reference to FIG. 3. The distribution device 4 includes a management unit 41, a communication unit 42, a distribution policy-aggregation policy information storage unit 43, a distribution policy setting unit 51, a data capturing unit 52, a data distribution unit 53, data output units 54A and 54B, an aggregation policy setting unit 61, data capturing units 62A and 62B, a data aggregation unit 63, and a data output unit 64.

In a case of the distribution device 4-1 installed in the base 9-1, the data capturing unit 52 connects to the service providing device 3 and receives and captures data transmitted by the service providing device 3. In a case of the distribution device 4-2 installed in the base 9-2, the data capturing unit 52 is connected to the main devices 7-1 and 7-2 via the access network 10, and receives and captures data transmitted by the main devices 7-1 and 7-2. Note that the data capturing unit 52 may include the number of devices to be connected, that is, the number of the service providing devices 3 or the main devices 7-1 and 7-2.

In the case of the distribution device 4-1 installed in the base 9-1, the data output unit 54A is connected to the line switching device 21-1 and transmits data to the line switching device 21-1. In the case of the distribution device 4-2 installed in the base 9-2, the data output unit 54A is connected to the line switching device 21-2 and transmits data to the line switching device 21-2.

In the case of the distribution device 4-1 installed in the base 9-1, the data output unit 54B is connected to the packet switching device 31-1 and transmits data to the packet switching device 31-1. In the case of the distribution device 4-2 installed in the base 9-2, the data output unit 54B is connected to the packet switching device 31-2 and transmits data to the packet switching device 31-2.

In the case of the distribution device 4-1 installed in the base 9-1, the data capturing unit 62A is connected to the line switching device 21-1 and receives and captures data transmitted by the line switching device 21-1. In the case of the distribution device 4-2 installed in the base 9-2, the data capturing unit 62A is connected to the line switching device 21-2 and receives and captures data transmitted by the line switching device 21-2.

In the case of the distribution device 4-1 installed in the base 9-1, the data capturing unit 62B is connected to the packet switching device 31-1 and receives and captures data transmitted by the packet switching device 31-1. In the case of the distribution device 4-2 installed in the base 9-2, the data capturing unit 62B is connected to the packet switching device 31-2 and receives and captures data transmitted by the packet switching device 31-2.

In the case of the distribution device 4-1 installed in the base 9-1, the data output unit 64 is connected to the service providing device 3 and transmits data to the service providing device 3. In the case of the distribution device 4-2 installed in the base 9-2, the data output unit 64 is connected to the main devices 7-1 and 7-2 via the access network 10 and transmits data to the main devices 7-1 and 7-2. Note that the data output unit 64 may include the number of devices to be connected, that is, the number of the service providing devices 3 or the main devices 7-1 and 7-2.

The communication unit 42 is connected to the distribution device control device 2 via a control line, and transmits and receives various control signals to and from the distribution device control device 2.

The distribution policy-aggregation policy information storage unit 43 stores a distribution policy table 70, a time division transmission table 71, and an information type transmission table 72 illustrated in FIG. 4, and an aggregation policy table 80, a time division reception table 81, a simultaneous reception table 82, and a selective reception table 83 illustrated in FIG. 5.

The distribution policy table 70 illustrated in FIG. 4(a) includes items of "distribution policy" and "selected state". In the item of "distribution policy", "time division transmission" and "information type transmission" which are types of the distribution policy of data in the distribution device 4 are written. In the item of "selected state", "○" or "x" is written, where "○" is written in a column corresponding to any one of the distribution policies selected in advance, and "x" is written in the remaining columns. FIG. 4(a) illustrates a state in which "information type transmission" is selected. Note that the notation of "○" or "x" is an example, and any information may be used as long as data processing is possible, and may be represented by a bit or a flag such as "1" or "0".

The time division transmission table 71 illustrated in FIG. 4(b) is a table that is referred to when the "time division transmission" is selected as the distribution policy, and includes items of "transmission time", "switching network type", "output destination", "transmission destination information", and "line identification information". In the item of "transmission time", information indicating a time slot for transmitting data is written. In the item of "switching network type", the type of the switching network of either "line switching network" or "packet switching network" is written. In the item of "output destination", information indicating an output destination to which the data distribution unit 53 outputs data is written. Note that FIG. 4(b) illustrates an example in which "data output unit A" and "data output unit B" are written, where "data output unit A" corresponds to the data output unit 54A, and "data output unit B" corresponds to the data output unit 54B. Note that FIG. 4(b) illustrates an example in which the output destination is switched in units of 30 seconds as an example in the item of "transmission time", but the output destination may be in units of milliseconds or hours. In addition, the designation of the time may be an elapsed time from the current time or an absolute time such as UNIX time (UNIX is a registered trademark, and so on). In addition, for example, a reservation time for selecting the data output unit B as the output destination after $X_1$ seconds to $X_2$ seconds may be indicated instead of those like the time slot. In addition, it is also possible to make a setting such that there is one record in FIG. 4(b) and the item of "transmission time" is blank, and output is fixedly performed to a specific output destination, or it is also possible to perform setting such that a record is not generated in FIG. 4(b) and output is not performed to any output destination.

The items of "transmission destination information" and "line identification information" are not used when the item of "switching network type" is "packet switching network", but are used when the item of "switching network type" is "line switching network". The item of "transmission destination information" is an item in which, when an individual line connected to another distribution device 4 is generated, information indicating a transmission destination added to data to be transmitted through the individual line is written. Here, the information indicating the transmission destination is, for example, an Internet protocol (IP) address or the like added to the data as the transmission destination. The item of "line identification information" is an item in which line identification information added to the generated line is written. Since the items of "transmission destination information" and "line identification information" are items used after a line is generated, these items are in a blank state where nothing is written in an initial state, but in a case where a line is generated in advance, information corresponding to the generated line is written in advance in the "transmission destination information" and the "line identification information".

The information type transmission table 72 illustrated in FIG. 4(c) is a table that is referred to when the "information type transmission" is selected as the distribution policy, and includes items of "protocol type", "switching network type", "output destination", "transmission destination information", and "line identification information". Information for identifying a protocol is written in the information of "protocol type". FIG. 4(c) illustrates an example in which names of two types of protocols, file transfer protocol (ftp) and hypertext transfer protocol (http), are written.

Information written in the items of "switching network type", "output destination", "transmission destination information", and "line identification information" is similar to that in the time division transmission table 71.

The aggregation policy table 80 illustrated in FIG. 5(*a*) has items of "aggregation policy" and "selected state". In the item of "aggregation policy", "time division reception", "simultaneous reception", and "selective reception", which are types of data aggregation policies in the distribution device 4, are written. In the item of "selected state", "∘" or "x" is written, where "∘" is written in a column corresponding to any one of the aggregation policies selected in advance, and "x" is written in the remaining columns. FIG. 5(*a*) illustrates a state in which "selective reception" is selected.

The time division reception table 81 illustrated in FIG. 5(*b*) is a table that is referred to when the "time division reception" is selected as the aggregation policy, and includes items of "reception time", "switching network type", and "capturing source". In the item of "reception time", information indicating a time slot for receiving data is written. In the item of "switching network type", the type of the switching network of either "line switching network" or "packet switching network" is written. In the item of "capturing source", information indicating a capturing source from which the data aggregation unit 63 captures data is written. Note that FIG. 5(*b*) illustrates an example in which "data capturing unit A" and "data capturing unit B" are written, where "data capturing unit A" corresponds to the data capturing unit 62A, and "data capturing unit B" corresponds to the data capturing unit 62B. Note that FIG. 5(*b*) illustrates an example in which the output destination is switched in units of 30 seconds as an example in the item of "reception time", but the output destination may be in units of milliseconds or hours. Further, the designation of the time may be an elapsed time from the current time or an absolute time such as UNIX time. In addition, a reservation time for selecting the data capturing unit B as a capturing source after $X_1$ seconds to $X_2$ seconds may be indicated, for example, instead of those like the time slot. In addition, it is also possible to make a setting such that there is one record in FIG. 5(*b*), and the item of "transmission time" is blank, and capturing is fixedly performed from a specific capturing source, or it is also possible to perform setting such that a record is not generated in FIG. 5(*b*) and capturing is not performed from any capturing source.

The simultaneous reception table 82 illustrated in FIG. 5(*c*) is a table that is referred to when the "simultaneous reception" is selected as the aggregation policy, and includes items of "switching network type" and "capturing source". Information written in the items of "switching network type" and "capturing source" is similar to that in the time division reception table 81.

The selective reception table 83 illustrated in FIG. 5(*d*) is a table that is referred to when the "selective reception" is selected as the aggregation policy, and includes items of "priority", "switching network type", and "capturing source". Information indicating priority such as "high" and "low" is written in the item of "priority". Information written in the items of "switching network type" and "capturing source" is similar to that in the time division reception table 81.

When the distribution device 4 is activated, the management unit 41 refers to the distribution policy table 70 and the aggregation policy table 80 stored in the distribution policy aggregation policy information storage unit 43. The management unit 41 reads information indicating the distribution policy (hereinafter referred to as "distribution policy information") stored in the table corresponding to the distribution policy in which the item of "selected state" is "∘" in the distribution policy table 70, that is, either one of the time division transmission table 71 or the information type transmission table 72. The management unit 41 outputs the read distribution policy information to the distribution policy setting unit 51. The management unit 41 reads information indicating the aggregation policy (hereinafter, referred to as "aggregation policy information") stored in the table corresponding to the aggregation policy in which the item of "selected state" is "∘" in the aggregation policy table 80, that is, any one of the time division reception table 81, the simultaneous reception table 82, or the selective reception table 83. The management unit 41 outputs the read aggregation policy information to the aggregation policy setting unit 61.

When the item of "selected state" of the distribution policy table 70 is rewritten, the management unit 41 refers to the table corresponding to the distribution policy in which the item "selected state" is newly set to "∘", and outputs information stored in the table to the distribution policy setting unit 51. When the item of "selected state" of the aggregation policy table 80 is rewritten, the management unit 41 refers to the table corresponding to the aggregation policy in which the item "selected state" is newly set to "∘", and outputs information stored in the table to the aggregation policy setting unit 61.

The management unit 41 stores the line switching device identification information of one of the line switching devices 21-1 and 21-2 connected to the distribution device 4 and the packet switching device identification information of one of the packet switching devices 31-1 and 31-2 connected to the distribution device 4 in an internal storage area in advance. In a case where the request of the distribution destination is received from the data distribution unit 53, the management unit 41 performs processing of requesting the distribution device control device 2 to specify the distribution destination via the communication unit 42.

The distribution policy setting unit 51 writes and sets the distribution policy information output by the management unit 41 in an internal storage area of the data distribution unit 53. That is, any one piece of the distribution policy information stored in the time division transmission table 71 or the information type transmission table 72 is written in the internal storage area of the data distribution unit 53.

The aggregation policy setting unit 61 writes and sets the aggregation policy information output by the management unit 41 in an internal storage area of the data aggregation unit 63. That is, any one piece of the aggregation policy information stored in the time division reception table 81 or the simultaneous reception table 82, or the selective reception table 83 is written to the internal storage area of the data aggregation unit 63.

The data distribution unit 53 captures data output by the data capturing unit 52, and outputs the captured data to the data output unit 54A or the data output unit 54B on the basis of the distribution policy information stored in the internal storage area.

The data aggregation unit 63 reads data captured by the data capturing unit 62A or the data capturing unit 62B on the basis of the aggregation policy information stored in the internal storage area, and outputs the read data to the data output unit 64.

Note that, in the following description, in a case where the internal configuration of each of the distribution devices 4-1 and 4-2 is illustrated, "-1" and "-2" as branch numbers of the reference numerals of the distribution devices 4-1 and 4-2 are attached to the reference numerals of the respective functional units included in the distribution device 4, and for example, in a case where the management unit 41 of the distribution device 4-1 is illustrated, the management unit 41 is illustrated as the management unit 41-1.

(Data Distribution Processing by Communication System of First Embodiment)

Figure 6:
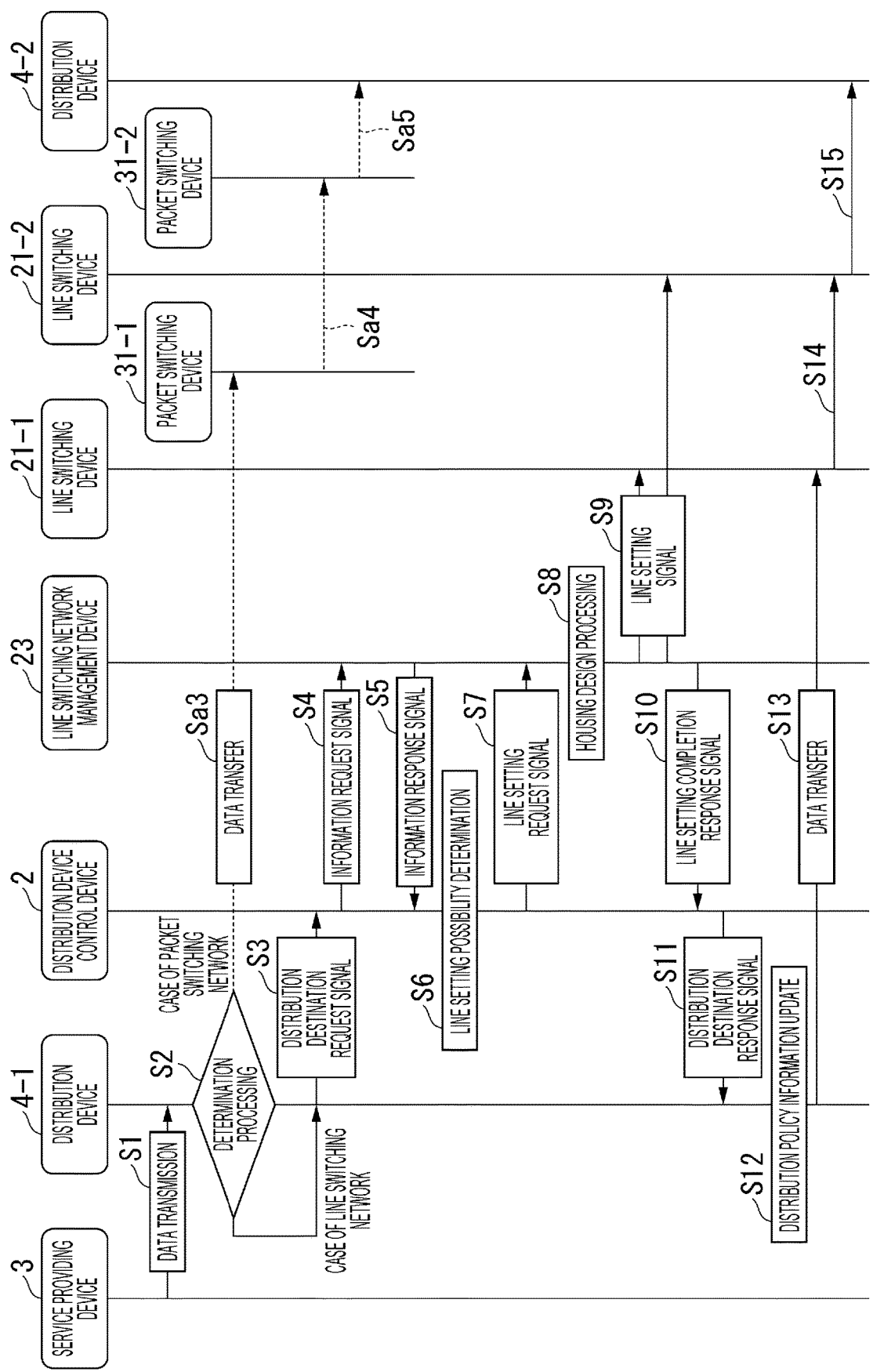
FIG. 6 is a sequence diagram (part 1) illustrating a flow of processing by the communication system of the first embodiment.
Figure 7:
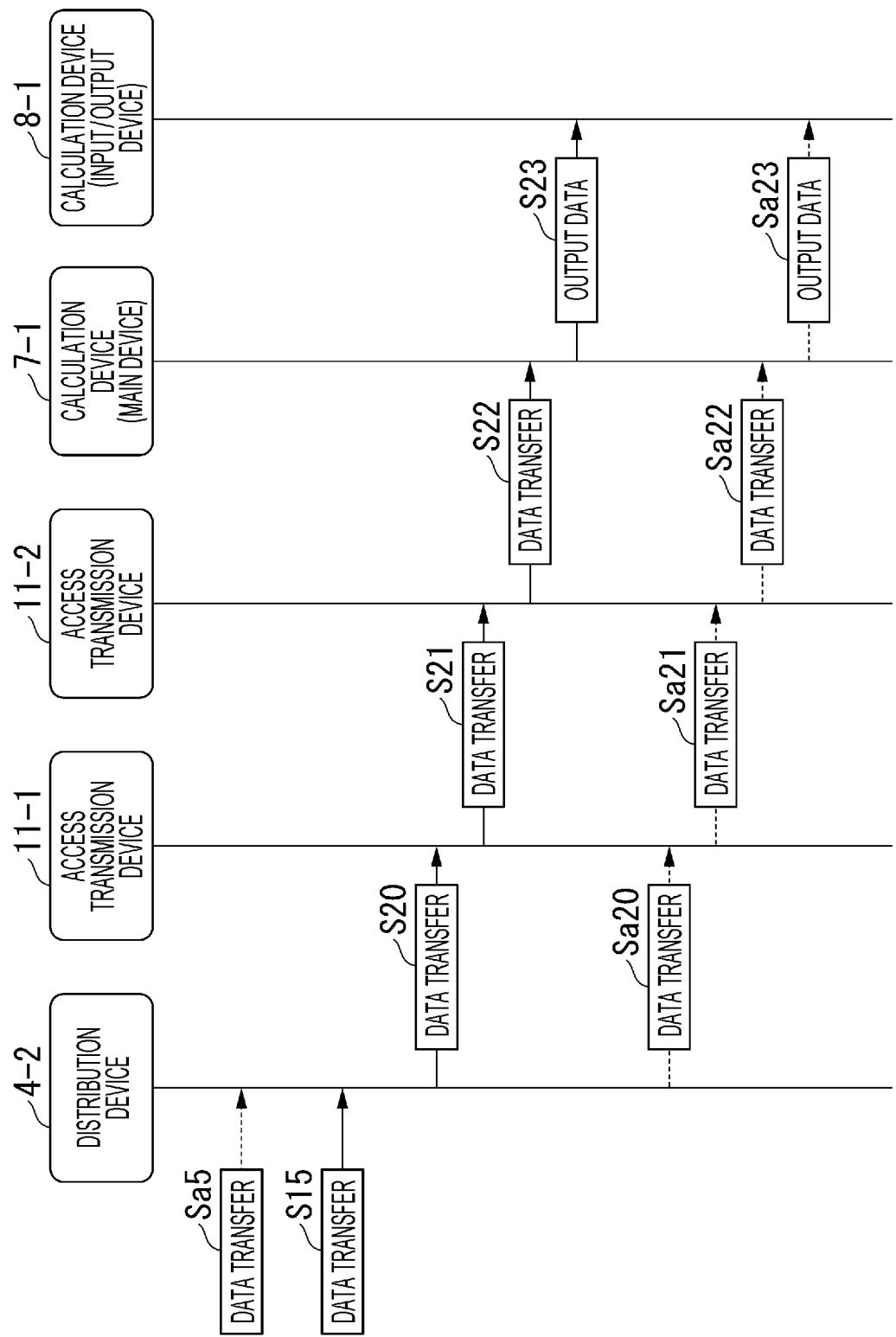
FIG. 7 is a sequence diagram (part 2) illustrating a flow of processing by the communication system of the first embodiment.

Next, data distribution processing by the communication system 1 will be described with reference to FIGS. 6 to 9. FIGS. 6 and 7 are sequence diagrams illustrating a flow of data distribution processing by the communication system 1.

Here, processing when the user of the user's home 5-1 uses the calculation device 6-1 to use the service provided by the service providing device 3 will be described. Note that, before the sequences of FIGS. 6 and 7 are started, a connection relationship is established between the service providing device 3 and the main device 7-1 of the calculation device 6-1, for example, in the IP layer, and data can be switched between both the devices.

In the distribution policy-aggregation policy information storage units 43-1 and 43-2 of the distribution devices 4-1 and 4-2, tables having the same contents as the distribution policy table 70, the time division transmission table 71, and the information type transmission table 72 illustrated in FIG. 4 and the aggregation policy table 80, the time division reception table 81, the simultaneous reception table 82, and the selective reception table 83 illustrated in FIG. 5 are stored in advance.

Therefore, when the distribution devices 4-1 and 4-2 are activated, the distribution policy information stored in the information type transmission tables 72-1 and 72-2 is written in the internal storage areas of the data distribution units 53-1 and 53-2, and the aggregation policy information stored in the selective reception tables 83-1 and 83-2 is written in the internal storage areas of the data aggregation units 63-1 and 63-2, by the management units 41-2 and 41-2, the distribution policy setting units 51-1 and 51-2, and the aggregation policy setting units 61-1 and 61-2.

First, processing until data transmitted by the service providing device 3 illustrated in FIG. 6 reaches the distribution device 4-2 will be described. The service providing device 3 generates data to be transmitted to the calculation device 6-1 according to a predetermined protocol, and adds, to the data, address information added in advance to the main device 7-1 of the calculation device 6-1 with respect to the generated data as information indicating a transmission destination (hereinafter, referred to as a "transmission destination address"). The service providing device 3 transmits the data to which the transmission destination address is added to the distribution device 4-1 (FIG. 6: step S1).

Upon receiving the data from the service providing device 3, the distribution device 4-1 performs determination processing of distributing the data on the basis of distribution policy information stored in an internal storage area (step S2 in FIG. 6). Here, the distribution policy information stored in the internal storage area of the data distribution unit 53-1 of the distribution device 4-1 has the same content as the information stored in the information type transmission table 72 illustrated in FIG. 4(*c*). Thus, in step S2, the distribution device 4-1 starts the processing of the flowchart illustrated in FIG. 8.

Figure 8:
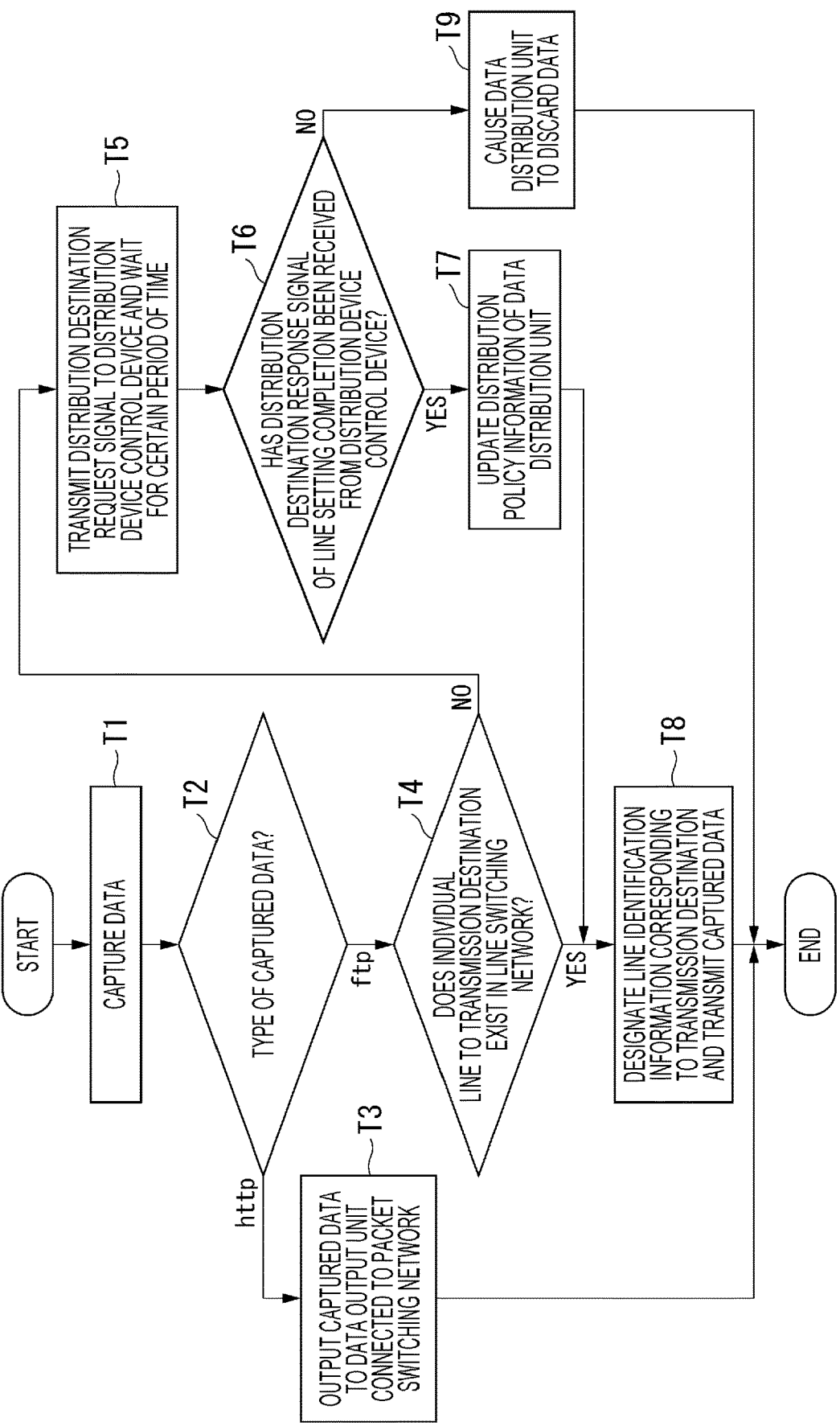
FIG. 8 is a flowchart illustrating a flow of processing by the distribution device of the first embodiment.

The data capturing unit 52-1 of the distribution device 4-1 receives and captures data transmitted by the service providing device 3. The data capturing unit 52-1 outputs the captured data to the data distribution unit 53-1 (FIG. 8: step T1). The data distribution unit 53-1 captures the data output by the data capturing unit 52-1, and determines whether the protocol type of the captured data is "ftp" or "http" on the basis of the distribution policy information stored in the internal storage area (FIG. 8: step T2).

(Case where Predetermined Protocol of Data is "http")

Here, in a case where the predetermined protocol when the service providing device 3 generates data is "http", the data distribution unit 53-1 determines that the protocol type of the captured data is "http" (FIG. 8: step T2, http), refers to the record of "http" of the distribution policy information stored in the internal storage area, and detects that the item of "switching network type" corresponding to "http" is "packet switching network" and the item of "output destination" is "data output unit B".

The "data output unit B" is the data output unit 54B-1 in the distribution device 4-1. Thus, the data distribution unit 53-1 outputs the captured data to the data output unit 54B-1. The data output unit 54B-1 captures the data output from the data distribution unit 53-1. The data output unit 54B-1 transmits the captured data to the packet switching device 31-1 connected to the distribution device 4-1 (FIG. 8: step T3). Note that the processing of step T3 in FIG. 8 corresponds to the processing of step Sa3 in FIG. 6.

Upon receiving the data transmitted by the data output unit 54B-1 of the distribution device 4-1, the packet switching device 31-1 converts the received data into a plurality of packets including a transmission destination address added to the data, and transfers each packet to the packet switching device 31-2 on the basis of the transmission destination address included in each of the converted packets and the route information defined in the internal storage area (FIG. 6: step Sa4). Upon receiving the packet transferred by the packet switching device 31-1, the packet switching device 31-2 detects that the transmission destination is the calculation device 6-1 connected to the distribution device 4-2 via the access network 10 on the basis of the transmission destination address included in the packet and the route information defined in the internal storage area. Thus, the packet switching device 31-2 restores the original data from the received packet, adds the transmission destination address to the restored data, and transmits the data to the distribution device 4-2 (step Sa5 in FIG. 6).

Note that, in a case where the packet switching network 30 is, for example, a switching network that transfers IP packets, and the service providing device 3 generates and transmits an IP packet each including a transmission destination address from data transmitted in advance, the packet switching device 31-1 transfers the packet received from the distribution device 4-1 as it is without performing processing of converting the data into the packet. The packet switching device 31-2 also transmits the received packet as it is to the distribution device 4-2 without restoring the original data from the packet received from the packet switching device 31-1.

(Case where Predetermined Protocol of Data is "ftp")

Next, a case where the predetermined protocol used when the service providing device 3 generates data is "ftp" will be described. The data distribution unit 53-1 determines that the protocol type of the captured data is "ftp" (FIG. 8: step T2, ftp), refers to the record of "ftp" of the distribution policy information stored in the internal storage area, and detects that the item of "switching network type" corresponding to "ftp" is "line switching network", the item of "output destination" is "data output unit A", and the item of "transmission destination information" and the item of "line identification information" are blank. Here, the "data output unit A" is the data output unit 54A-1 in the distribution device 4-1.

The data distribution unit 53-1 determines whether or not the individual line to the transmission destination exists in the line switching network 20 (FIG. 8: step T4). Here, since the item of "transmission destination information" and the item of "line identification information" of the record in which the item of "switching network type" of the distribution policy information stored in the internal storage area of the data distribution unit 53-1 is "line switching network" are blank, the data distribution unit 53-1 determines that the individual line to the transmission destination does not exist in the line switching network 20 (FIG. 8: step T4, No), and outputs the transmission destination address added to the data to the management unit 41-1, thereby requesting the distribution destination in the line switching network 20 for the transmission destination address. Upon receiving the transmission destination address from the data distribution unit 53-1, the management unit 41-1 transmits a distribution destination request signal including the received transmission destination address and the line switching device identification information of the line switching device 21-1, to which the distribution device 4-1 is connected, stored in the internal storage area, to the distribution device control device 2 via the communication unit 42-1, and waits for a certain period of time (FIG. 8: step T5). Note that the processing of step T5 in FIG. 8 corresponds to the processing of step S3 in FIG. 6.

Upon receiving the distribution destination request signal from the distribution device 4-1, the distribution device control device 2 reads the transmission destination address included in the received distribution destination request signal and the line switching device identification information of the line switching device 21-1. The distribution device control device 2 transmits an information request signal including the read transmission destination address and the line switching device identification information of the line switching device 21-1 to the line switching network management device 23 (step S4 in FIG. 6). Upon receiving the information request signal from the distribution device control device 2, the line switching network management device 23 reads the transmission destination address included in the received information request signal and the line switching device identification information of the line switching device 21-1.

As described above, the line switching network management device 23 stores in advance information that associates the address information that is information indicating a plurality of transmission destinations with the line switching device identification information of the line switching devices 21-1 to 21-4 corresponding to the plurality of pieces of address information. The line switching network management device 23 detects the line switching device identification information of the line switching device 21-2 corresponding to the read transmission destination address on the basis of the information. The line switching network management device 23 detects a free state of resources between the line switching device 21-1 and the line switching device 21-2, and when there is a free resource, transmits an information response signal including the read transmission destination address and the line switching device identification information of the line switching device 21-1, the detected line switching device identification information of the line switching device 21-2, and information indicating that there is a free resource to the distribution device control device 2 (FIG. 6: step S5). Note that, when there is no free resource, the line switching network management device 23 transmits the information response signal including the read transmission destination address, the line switching device identification information of the line switching device 21-1, and information indicating that there is no free resource to the distribution device control device 2.

Upon receiving the information response signal from the line switching network management device 23, the distribution device control device 2 performs determination of line setting possibility on the basis of the information included in the information response signal (FIG. 6: step S6). That is, the distribution device control device 2 determines that the line setting can be performed when the information included in the information response signal indicates that there is a free resource, and determines that the line setting cannot be performed when the information included in the information response signal indicates that there is no free resource. Here, the description of the processing will be continued on the assumption that the information included in the information response signal indicates that there is a free resource.

Upon determining that the line setting can be performed, the distribution device control device 2 transmits a line setting request signal including the transmission destination address included in the information response signal, the line switching device identification information of the line switching device 21-1, and the line switching device identification information of the line switching device 21-2 to the line switching network management device 23 (FIG. 6: step S7).

Upon receiving the line setting request signal from the distribution device control device 2, the line switching network management device 23 reads the line switching device identification information of the line switching device 21-1 and the line switching device identification information of the line switching device 21-2 from the received line setting request signal. The line switching network management device 23 performs the processing of housing design on the basis of the read line switching device identification information of the line switching device 21-1 and the line switching device identification information of the line switching device 21-2 (FIG. 6: step S8). The line switching network management device 23 transmits a line setting signal including setting information for the line switching device 21-1 generated by the processing of housing design to the line switching device 21-1. The line switching network management device 23 transmits a line setting signal including setting information for the line switching device 21-2 generated by the processing of housing design to the line switching device 21-2 (FIG. 6: step S9). Each of the line switching devices 21-1 and 21-2 generates an individual line of the optical path through the optical transmission devices 22-1 and 22-2 between the line switching devices 21-1 and 21-2 on the basis of the setting information included in the line setting signals received from the line switching network management device 23.

The line switching network management device 23 newly generates line identification information corresponding to the individual line generated between the line switching devices 21-1 and 21-2. The line switching network management device 23 transmits a line setting completion response signal including the generated line identification information and the transmission destination address included in the line setting request signal to the distribution device control device 2 (FIG. 6: step S10). Upon receiving the line setting completion response signal from the line switching network management device 23, the distribution device control device 2 reads the line identification information and the transmission destination address included in the received line setting completion response signal. The distribution device control device 2 transmits a distribution destination response signal including the read line identification information, transmission destination address, and information indicating completion of line setting to the distribution device 4-1 (FIG. 6: step S11).

Upon receiving the distribution destination response signal from the distribution device control device 2 via the communication unit 42-1 while waiting for a certain period of time in step T5 of FIG. 8, the management unit 41-1 of the distribution device 4-1 determines whether or not the distribution destination response signal includes information indicating completion of line setting (FIG. 8: step T6). Here, since the information indicating the completion of line setting is included in the distribution destination response signal, the management unit 41-1 determines that the information indicating the completion of line setting is included in the distribution destination response signal (FIG. 8: step T6, Yes), and reads the line identification information and the transmission destination address included in the received distribution destination response signal. The management unit 41-1 outputs the read line identification information and transmission destination address to the distribution policy setting unit 51-1.

The distribution policy setting unit 51-1 captures the line identification information and the transmission destination address output by the management unit 41-1, writes the captured line identification information and transmission destination address in the distribution policy information stored in the internal storage area of the data distribution unit 53-1, and updates the distribution policy information (FIG. 8: step T7). That is, as illustrated in FIG. 9, the distribution policy setting unit 51-1 writes the captured transmission destination address in the item of "transmission destination information" of the record in which the item of "protocol type" of the distribution policy information stored in the internal storage area of the data distribution unit 53-1 is "ftp", and writes the captured line identification information in the item of "line identification information" to perform update. Note that, in FIG. 9, the transmission destination address included in the distribution destination response signal is indicated as "(transmission destination address)", and the line identification information included in the distribution destination response signal is indicated as "000001". Note that the processing of steps T6 and T7 in FIG. 8 corresponds to the processing of step S12 in FIG. 6.

The data distribution unit 53-1 detects the line identification information "000001" corresponding to the transmission destination address added to the captured data from the distribution policy information stored in the internal storage area, adds the detected line identification information "000001", and outputs the data to the data output unit 54A-1. Upon capturing data to which the line identification information "000001" output from the data distribution unit 53-1 is added, the data output unit 54A-1 designates the line identification information "000001" added to the captured data and transmits the data to the line switching device 21-1 (FIG. 8: step T8). Note that the processing of step T8 in FIG. 8 corresponds to the processing of step S13 in FIG. 6.

Upon receiving the data transmitted with the line identification information "000001" designated by the data output unit 54A-1 of the distribution device 4-1, the line switching device 21-1 transfers the data through the individual line corresponding to the line identification information "000001" (step S14). Upon receiving the data transferred by the line switching device 21-1, the line switching device 21-2 refers to the transmission destination address added to the received data, and detects that the transmission destination is the calculation device 6-1 connected to the distribution device 4-2 via the access network 10. Thus, the line switching device 21-2 transmits the received data to the distribution device 4-2 (step S15).

Next, processing in which the distribution device 4-2 transmits the received data to the calculation device 6-1 will be described with reference to FIG. 7. As described above, the aggregation policy information stored in the internal storage area of the data aggregation unit 63-2 of the distribution device 4-2 has the same content as the information stored in the selective reception table 83 illustrated in FIG. 5(*d*). The data aggregation unit 63-2 refers to the item of "priority" of the aggregation policy information stored in the internal storage area, refers to the record in which the "priority" is "high", and detects the "line switching network" in the item of "switching network type" and the "data capturing unit A" in the item of "capturing source". Here, the "data capturing unit A" is the data capturing unit 62A-2 in the distribution device 4-2.

The data aggregation unit 63-2 reads data received and captured by the data capturing unit 62A-2 from the line switching device 21-2, and outputs the read data to the data output unit 64-2. The data output unit 64-2 captures data output from the data aggregation unit 63-2 and transmits the captured data to the access transmission device 11-1 (FIG. 7: step S20). The access transmission device 11-1 receives the data transmitted by the data output unit 64-2 of the distribution device 4-2, and transfers the received data to the access transmission device 11-2 (FIG. 7: step S21). The access transmission device 11-2 receives the data transferred by the access transmission device 11-1, and transmits the received data to the main device 7-1 of the calculation device 6-1 (FIG. 7: step S22).

In a case where the data received by the main device 7-1 from the access transmission device 11-2 is, for example, moving image data, the main device 7-1 outputs the moving image data to the output unit of the input/output device 8-1 (FIG. 7: step S23). In this case, the output unit of the input/output device 8-1, for example, a display, displays the moving image data on a screen. When the data received by the main device 7-1 from the access transmission device 11-2 is, for example, downloaded data such as a software program, the main device 7-1 writes and stores the received data in an internal storage area, and outputs output data to be output by the output unit of the input/output device 8-1, for example, data indicating a reception progress of the downloaded data, to the output unit of the input/output device 8-1. In this case, the output unit of the input/output device 8-1 displays data indicating the reception progress of the downloaded data on the screen.

When the data aggregating unit 63-2 has read all the data received and captured by the data capturing unit 62A-2 from the line switching device 21-2, next, the data aggregation unit 63-2 refers to the record in which the "priority" of the aggregation policy information stored in the internal storage area is "low", and detects the "packet switching network" of the item of "switching network type" and the "data capturing unit B" of the item of "capturing source". Here, the "data capturing unit B" is a data capturing unit 62B-2 in the distribution device 4-2.

The data aggregation unit 63-2 reads data received and captured by the data capturing unit 62B-2 from the packet switching device 31-2 and outputs the read data to the data output unit 64-2. The data output unit 64-2 captures data output from the data aggregation unit 63-2 and transmits the captured data to the access transmission device 11-1 (FIG. 7: step Sa20). In the processing of steps Sa21 to Sa23, the same processing as steps S21 to S23 is performed.

(Branching Processing of Step T4 of FIG. 8)

When the above-described processing of step T4 in FIG. 8 of the first embodiment is performed, it is assumed that the internal storage area of the data distribution unit 53-1 has already stored the distribution policy information illustrated in FIG. 9. In other words, it is assumed that the individual line corresponding to the transmission destination address added to the data output by the data capturing unit 52-1 and captured by the data distribution unit 53-1 has already been generated. In this case, since the information exists in the item of "transmission destination information" and the item of "line identification information" corresponding to the record in which the item of "protocol type" of the distribution policy information stored in the internal storage area is "ftp", the data distribution unit 53-1 determines that the individual line to the transmission destination exists in the line switching network 20 (FIG. 8: step T4, Yes). Thereafter, the processing of step T8 is performed using the transmission destination address written in the item of "transmission destination information" corresponding to the record in which the item of "protocol type" of the distribution policy information stored in the internal storage area of the data distribution unit 53-1 is "ftp" and the line identification information written in the item of "line identification information".

(Branching Processing of Step T6 of FIG. 8)

In step T6 of FIG. 8, when the distribution device control device 2 receives the information response signal including the information indicating that there is no free resource from the line switching network management device 23, the distribution device control device 2 transmits the distribution destination response signal including the information indicating that the line setting cannot be performed to the distribution device 4-1. When an error occurs in the processing of housing design in step S8 of FIG. 6 or when the line setting cannot be performed in the line switching devices 21-1 and 21-2, the line switching network management device 23 transmits a line setting failure signal instead of the line setting completion response signal in step S10 of FIG. 6. Also when the line setting failure signal is received from the line switching network management device 23, the distribution device control device 2 transmits the distribution destination response signal including information indicating that the line setting cannot be performed to the distribution device 4-1. In a case where the information indicating that the line setting cannot be performed is included in the distribution destination response signal as described above, the management unit 41-1 of the distribution device 4-1 determines that the information indicating that the line setting is completed is not included in the distribution destination response signal (FIG. 8: step T6, No). Also when the above-described processing of step T5 in FIG. 8 ends and the management unit 41-1 of the data distribution unit 53-1 does not receive the distribution destination response signal from the distribution device control device 2 even after a certain period of time elapses due to some kind of failure occurring while waiting for a certain period of time, the management unit 41-1 also makes the determination of "No" in the determination in step T6.

As described above, in a case where the determination of "No" is made in the determination of step T6, as illustrated in the flowchart of FIG. 8, the management unit 41-1 may cause the data distribution unit 53-1 to discard the data captured at that time via the distribution policy setting unit 51-1 (FIG. 8: step T9), or may cause the data distribution unit 53-1 to output the data captured at that time to the data output unit 54B-1 to have the data transferred via the packet switching network 30.

Note that in a case where the management unit 41-1 repeats the processing of step T6 a predetermined number of times, and the determination of "No" is made as a result in the determination of step T6, the management unit 41-1 may cause the data distribution unit 53-1 to discard the data captured at that time, or cause the data output unit 54B-1 to output the data to have the data transferred via the packet switching network 30.

Further, in the above-described processing of step S10 in FIG. 6, in a case where the line switching network management device 23 adds information indicating that the line corresponding to the line identification information is enabled after a predetermined time to the line setting completion response signal and transmits the signal, the distribution device control device 2 adds information indicating that the line corresponding to the line identification information is enabled after a predetermined time and transmits the distribution response signal to the distribution device 4-1. In this case, the management unit 41-1 of the distribution device 4-1 makes a determination of Yes in the processing of step T6 in FIG. 8, and then, in the processing of step T7, outputs information indicating that data is transmitted after waiting for a predetermined time, the line identification information, and the transmission destination address to the distribution policy setting unit 51-1. The distribution policy setting unit 51-1 captures the line identification information and the transmission destination address output from the management unit 41-1, writes the captured line identification information and the transmission destination address in the distribution policy information stored in the internal storage area of the data distribution unit 53-1, and notifies the data distribution unit 53-1 of the information indicating that data is transmitted after waiting for a predetermined time. The data distribution unit 53-1 may accumulate the data in the internal storage area and perform the processing of step T8, that is, output the data to the data output unit 54A-1 after a predetermined time. However, in a case where the area of the internal storage area is insufficient to accumulate data, the data distribution unit 53-1 may discard the data or output the data to the data output unit 54B-1 and transfer the data via the packet switching network 30.

Further, in the above-described processing of step S5 in FIG. 6, the line switching network management device 23 detects the free state of the resource between the line switching device 21-1 and the line switching device 21-2, and transmits the information response signal including information indicating the presence or absence of free resource to the distribution device control device 2. The information indicating the presence or absence of free resource may not be information regarding the current free resource, but may be information regarding a future free resource, for example, information indicating whether or not a resource is likely to be secured after a certain period of time. In a case where the resource can be secured after a certain period of time, the distribution device control device 2 performs the processing of step S7 after waiting for the certain period of time in the processing of step S6.

In addition, the line switching network management device 23 may transmit the information response signal including information indicating availability of the line switching network 20 instead of the information indicating the presence or absence of free resource. For example, the line switching network management device 23 may store information indicating availability of the line switching network 20 in advance for each address information, determine the availability of the line switching network 20 for the user of the transmission source of data, and transmit the information response signal including the information indicating the availability to the distribution device control device 2. In this case, since the address information of the transmission source of data is required, the data distribution unit 53-1 of the distribution device 4-1 outputs the transmission source address included in the data, that is, the address information of the service providing device 3 to the management unit 41-1 together with the transmission destination address, the management unit 41-1 transmits the distribution destination request signal to which the transmission source address is added to the distribution device control device 2, and the distribution device control device 2 needs to transmit the information request signal to which the transmission source address is added to the line switching network management device 23 in the processing of step S4 in FIG. 6.

Furthermore, in the processing flow illustrated in FIG. 6, the mode in which the operations in and after step S2 are executed with the data transmission as a trigger has been described, but the series of processes in and after step S2 may be performed before actual data transmission. This makes it possible to continuously construct a communication path when collective communication is performed, instead of constructing a line for each data transmission. In addition, in a case where a communication path cannot be immediately constructed, transmission and reception by reservation such as use after a predetermined time, for example, 10 seconds can be performed.

Note that, in the first embodiment described above, the flow of processing in which the service providing device 3 transmits data and the main device 7-1 receives data has been described. Thus, it is indicated that the distribution device 4-1 performs processing of distributing and transmitting data on the basis of the distribution policy information, and the distribution device 4-2 performs processing of capturing data on the basis of the aggregation policy information. Meanwhile, data is transmitted and received to and from each other, and positions of transmission and reception may be switched. For example, in a case where the service providing device 3 provides a service for storing a file, the main device 7-1 uploads a large amount of data to the service providing device 3. In this case, the distribution device 4-2 performs processing of distributing and transmitting the data on the basis of the distribution policy information, and the distribution device 4-1 performs processing of capturing the received data on the basis of the aggregation policy information.

In the first embodiment described above, each of the distribution devices 4-1 and 4-2 is connected to the line switching network 20 and the packet switching network 30, the distribution device 4-1 or 4-2 selects either the line switching network 20 or the packet switching network 30 as the distribution destination on the basis of the distribution policy information in a case where data to which the service providing device 3 or the calculation device 6-1 is set as a transmission destination is received, and transmit the received data to the selected switching network, and the distribution device 4-1 or 4-2 captures the received data on the basis of the aggregation policy information and transmits the data to the service providing device 3 or the calculation device 6-1 corresponding to the transmission destination of the captured data in a case where data transmitted by the other distribution device 4-1 and 4-2 is received from the line switching network 20 or the packet switching network 30.

Consequently, for example, in a case where data is transmitted from the service providing device 3 to the calculation device 6-1 or in a case where data is transmitted from the calculation device 6-1 to the service providing device 3, it is possible to select a route via the line switching network 20 or a route via the packet switching network 30 according to the type of protocol and transmit the data. Thus, in the communication system 1 including the packet switching network 30, by using the line switching network 20, for example, a desired communication capacity can be easily secured for each service, and communication quality suitable for the service can be provided.

In the first embodiment described above, ftp and http are illustrated as examples of protocol types, and in a case where a large amount of data is transferred by ftp for example, it is possible to generate the individual line in the line switching network 20 and transfer the large amount of data. Thus, in the packet switching network 30, it is possible to avoid consumption of a large resource due to the transfer of a large amount of data, and it is possible to stabilize transfer processing of data transmitted and received when reference processing of a website is performed by http without causing a large delay or the like. On the other hand, since the transfer of the large amount of data can be performed by the individual line, it is possible to adjust the time required for the transfer of the large amount of data not to be long by adjusting the communication capacity of the generated individual line.

For example, by setting a protocol for performing real-time communication such as web conference in the information type transmission table 72 instead of ftp, it is possible to transfer data via the line switching network 20 capable of securing the individual line of a fixed band in a case of communication using such a protocol. Thus, it is possible to provide a moving image and audio with less delay in a web conference or the like.

In the first embodiment described above, the management unit 41-1 of the distribution device 4-1 transmits a line disconnection request signal including the line identification information of the generated individual line to the distribution device control device 2 via the communication unit 42-1 after the transmission of the data is completed or after a certain period of time elapses after the transmission of the data is completed. The distribution device control device 2 receives the line disconnection request signal from the distribution device 4-1 and transmits the received line disconnection request signal to the line switching network management device 23. The line switching network management device 23 disconnects the line corresponding to the line identification information included in the line disconnection request signal received from the distribution device control device 2. The management unit 41-1 erases, via the distribution policy setting unit 51, the transmission destination address and the line identification information corresponding to the disconnected individual line from the distribution policy information stored in the internal storage area of the data distribution unit 53-1. By disconnecting the individual line, resources in the line switching network 20 are released, so that efficient use of resources in the line switching network 20 becomes possible.

Note that, after the transmission of data is completed without disconnecting the line as described above and without disconnecting the line set once, the line switching network management device 23 may set the line switching devices 21-1 and 21-2 such that transmission and reception of data is temporarily disabled on the line in which the data transmission is completed. In this case, next, when the line switching network management device 23 receives the line setting request signal from the distribution device control device 2 and the route requested by the received line setting request signal has already been set, the line switching network management device 23 can omit the processing of housing design in step S8 and the processing of line setting in step S9 in FIG. 6 and reuse the set line as long as the line switching network management device 23 sets the line switching devices 21-1 and 21-2 to a state in which transmission and reception of data can be performed.

In the first embodiment described above, as illustrated in FIG. 9, one individual line is generated for each transmission destination address, but the line may be shared among a plurality of users. For example, it is assumed that a line whose line identification information is "000001" has already been generated between the line switching device 21-1 and the line switching device 21-2 for transfer of data to be transmitted from the service providing device 3 to the calculation device 6-1. In this case, it is assumed that the service providing device 3 starts transmission of data to the calculation device 6-2. In this case, as illustrated in step S7 of FIG. 6, the line switching network management device 23 receives, from the distribution device control device 2, the line setting request for generating the individual line between the line switching device 21-1 and the line switching device 21-2 with respect to the address information added in advance to the main device 7-2 of the calculation device 6-2. At this time, the line switching network management device 23 may transmit the line setting completion response signal including the address information added in advance to the main device 7-2 and the line identification information "000001" of the line that has already been generated to the distribution device control device 2 without generating the individual line between the line switching device 21-1 and the line switching device 21-2. Thus, the data whose transmission destination is the calculation device 6-1 and the calculation device 6-2 can be transmitted through the line between the line switching device 21-1 and the line switching device 21-2, and resources of the line switching network 20 can be effectively used. However, in a case where the service providing device 3 designates that the line with the line identification information "000001" is used only for transfer of data of the calculation device 6-1, one individual line is generated for each transmission destination address as described in the above first embodiment.

In the above first embodiment, an example in which one line of the line identification information "000001" is generated in the line switching network 20 has been described, but in a case where two or more lines are generated in the line switching network 20, the configuration of the distribution policy information stored in the internal storage area of the data distribution unit 53-1 illustrated in FIG. 9 is as follows. For example, in the communication system 1 illustrated in FIG. 1, it is assumed that the line switching device 21-3 and the packet switching device 31-3 are installed in the same base 9-3, a distribution device (hereinafter, this distribution device is referred to as a distribution device a) different from the distribution devices 4-1 and 4-2 is installed in the base 9-3, and the calculation device 6-3 including the main device 7-3 and the input/output device 8-3 is connected to the distribution device a via an access network different from the access network 10. In a case where the data providing device 3 sets the transmission destination address as the address information added to the main device 7-3 and transmits data according to the ftp protocol, the distribution device control device 2 generates the line between the line switching device 21-1 and the line switching device 21-3 in the line switching network 20 by processing similar to the sequence illustrated in FIG. 6. The line identification information of this line is "000002". In this case, in the distribution policy information stored in the internal storage area of the data distribution unit 53-1 illustrated in FIG. 9, two pieces of the address information and the line identification information, which are a combination of the address information added to the main device 7-1 and the line identification information "000001", and a combination of the address information added to the main device 7-3, and the line identification information "000002", are written in the item of "transmission destination information" and the item of "line identification information" of the record of the protocol type "ftp". Therefore, when transmitting data to the main device 7-1, the data distribution unit 53-1 adds the line identification information "000001", which corresponds to the address information of the main device 7-1 added to the data as the transmission destination address, to the data and outputs the data to the data output unit 54A-1. Furthermore, when transmitting data to the main device 7-3, the data distribution unit 53-1 adds the line identification information "000002", which corresponds to the address information of the main device 7-3 added to the data as the transmission destination address, to the data and outputs the data to the data output unit 54A-1. Thus, when receiving the data to which the line identification information "000001" is added from the data output unit 54A-1, the line switching device 21-1 transfers the data to the distribution device 4-2 through the line corresponding to the line identification information "000001", and the distribution device 4-2 transfers the data to the main device 7-1. When receiving the data to which the line identification information "000002" is added from the data output unit 54A-1, the line switching device 21-1 transfers the data to the distribution device a through the line corresponding to the line identification information "000002", and the distribution device a transfers the data to the main device 7-3.

In the flowchart illustrated in FIG. 6, a mode is described in which the operation in the subsequent stage is executed in response to the data transmission, but the series of the flowchart in and after step S2 may be performed before actual transmission of data. This makes it possible to continuously construct a communication path when collective communication is performed, instead of constructing a line for each data transmission. In addition, in a case where a communication path cannot be immediately constructed, transmission and reception by reservation such as use after a certain time (for example, after 10 seconds) is also possible.

(Time Division Transmission Processing)

In a case where the time division transmission is selected in the distribution policy table 70-1, the distribution policy information stored in the time division transmission table 71-1 is stored in the internal storage area of the data distribution unit 53-1. In a case where the content of the distribution policy information stored in the internal storage area of the data distribution unit 53-1 is the same as the content of the time division transmission table 71 illustrated in FIG. 4(*b*), the data distribution unit 53-1 selects output to the line switching network 20 for a time slot of 0 to 29 seconds per minute in the processing of step S2 of FIG. 6, and outputs the captured data to the data output unit 54A-1.

However, since no individual line is generated in the first time slot, the processing of steps S3 to 12 is performed. For a time slot of 30 to 59 seconds per minute, the data distribution unit 53-1 selects output to the packet switching network 30, and outputs the captured data to the data output unit 54B-1.

In a case where the time division transmission is selected in the distribution device 4-1, it is assumed that the service providing device 3 transmits a large amount of data. In this case, the data distribution unit 53-1 of the distribution device 4-1 divides the large amount of data into a size that can be transmitted with the time length of the time slot, switches the output destination to either the data output unit 54A-1 or the data output unit 54B-1 for each time slot, and outputs the divided data. Thus, since the distribution device 4-2 receives the divided data from the line switching device 21-2 and the packet switching device 31-2, the data aggregation unit 63-2 of the distribution device 4-2 captures the divided data from the data capturing unit 62A-2 and the data capturing unit 62B-2 in random order. In this case, the data aggregation unit 63-2 of the distribution device 4-2 may aggregate the divided data, arrange the data in order, restore the original large amount of data, and output the restored data to the data output unit 64-1.

In the case of time division transmission, the transfer destination may be switched in units of data to be transmitted, instead of changing the transfer destination in time slots as in the time division transmission table 71. That is, the data distribution unit 53-1 may output the data first transmitted by the service providing device 3 to the data output unit 54A-1 to have the data transferred by the line switching network 20 until the transmission of the data is completed, for example, and may then continuously output the data transmitted by the service providing device 3 to the data output unit 54B-1 to have the data transferred by the packet switching network 30 until the transmission of the data is completed.

(Other Modes of Information Type Transmission)

The information type transmission table 72 illustrated in FIG. 4(c) illustrates an example in which "ftp" and "http" are included in the item of "protocol type", but protocols other than these, for example, Secure Shell (SSH) File Transfer Protocol (SFTP), Secure Copy (SCP), Remote Copy (RCP), rsync, Network File System (NFS), and Server Message Block (SMB) which are file transfer protocols similar to ftp may be included. In addition, an NVMe over Fabrics protocol used for data transfer between storage servers may be included. In addition, "smtp (simple mail transfer protocol)" used for transmission and reception of electronic mails may be included. In the information type transmission table 72, for example, a record related to the protocol for transferring data via the line switching network 20 may be written, and for a protocol not written in the information type transmission table 72, data may be transferred via the packet switching network 30 with the output destination fixed to the data output unit 54B. The information type transmission table 72 may include not a protocol type but information associated with data transmitted by the service providing device 3, for example, a record for each of a transmission destination address, a virtual local area network (VLAN)-identifier (ID), an output physical port, an output logical port, and a port number. In a case where the service providing device 3 and the distribution device 4 are connected by an optical path, the information type transmission table 72 may include a record for each of a wavelength, an output physical port, and a modulation method.

(Time Division Reception Processing)

In a case where time division reception is selected in the aggregation policy table 80-2, the internal storage area of the data aggregation unit 63-2 stores the aggregation policy information stored in the time division reception table 81-2. When the content of the aggregation policy information stored in the internal storage area of the data aggregation unit 63-2 is the same as the content of the time division reception table 81 illustrated in FIG. 5(b), the data aggregation unit 63-2 reads data from the data capturing unit 62A-2 connected to the line switching device 21-2 for the time slot of 0 to 29 seconds per minute, and outputs the read data to the data output unit 64-2. For the time slot of 30 to 59 seconds per minute, the data aggregation unit 63-2 reads data from the data capturing unit 62B-2 connected to the packet switching device 31-2, and outputs the read data to the data output unit 64-2.

(Simultaneous Reception Processing)

In a case where the simultaneous reception is selected in the aggregation policy table 80-2, the internal storage area of the data aggregation unit 63-2 stores the aggregation policy information stored in the simultaneous reception table 82-2. When the content of the aggregation policy information stored in the internal storage area of the data aggregation unit 63-2 is the same as the content of the simultaneous reception table 82 illustrated in FIG. 5(c), the data aggregation unit 63-2 reads data from both the data capturing unit 62A-2 and the data capturing unit 62B-2, and outputs the read data to the data output unit 64-2.

(Other Modes of Selective Reception)

In the selective reception table 83 illustrated in FIG. 5(d), whether to preferentially receive data from the line switching network 20 or preferentially receive data from the packet switching network 30 can be selected by the item of "priority". On the other hand, for example, as the selective reception table 83, a condition for receiving data preferentially from a side where communication having a large data capacity occurs may be defined. In a case where this condition is set, for example, in the first embodiment described above, the data aggregation unit 63-2 of the distribution device 4-2 compares the amount of data accumulated by the data capturing unit 62A-2 with the amount of data accumulated by the data capturing unit 62B-2, and reads data from the larger amount of accumulated data.

In the case of the aggregation policy of selective reception, first, simultaneous reception is performed, and when the upper limit of the capability of capturing data is exceeded in the data aggregation unit 63-2 during simultaneous reception, the data aggregation unit 63-2 may switch to selective reception and read data from one of the data capturing unit 62A-2 and the data capturing unit 62B-2 according to the condition defined in the aggregation policy information of selective reception stored in the internal storage area.

(Policy Selection by User or Service Provider)

By the user operating the calculation device 6-1 or the service provider which is the operator of the service providing device 3 operating its own management device to access the distribution devices 4-1 and 4-2, and arbitrarily rewriting "∘" and "x" of "selected states" of the distribution policy tables 70-1 and 70-2 of the distribution policy-aggregation policy information storage units 43-1 and 43-2 of the distribution devices 4-1 and 4-2, the time division transmission and the information type transmission may be switched according to the purpose. By the user operating the calculation device 6-1 or the service provider which is the operator of the service providing device 3 operating its own management device, a table for storing new distribution policy information other than the time division transmission tables 71-1 and 71-2 and the information type transmission tables 72-1 and 72-2 may be generated in the distribution policy-aggregation policy information storage units 43-1 and 43-2. In this case, the name of the new distribution policy is written in the item of "distribution policy" of the distribution policy tables 70-1 and 70-2, and "○" and "x" of the "selected state" of the distribution policy tables 70-1 and 70-2 are rewritten such that the newly generated table is selected.

Similarly, by the user operating the calculation device 6-1 or the service provider which is the operator of the service providing device 3 operating its own management device to access the distribution devices 4-1 and 4-2, and arbitrarily rewriting "○" and "x" of "selected states" of the aggregation policy tables 80-1 and 80-2 of the distribution policy-aggregation policy information storage units 43-1 and 43-2 of the distribution devices 4-1 and 4-2, the time division reception, the simultaneous reception, and the selective reception may be switched according to the purpose. By the user operating the calculation device 6-1 or the service provider which is the operator of the service providing device 3 operating its own management device, a table for storing new aggregation policy information other than the time division reception tables 81-1 and 81-2, the simultaneous reception tables 82-1 and 82-2, and the selective reception tables 83-1 and 83-2 may be generated in the distribution policy-aggregation policy information storage units 43-1 and 43-2. In this case, the name of the new aggregation policy is written in the item of "aggregation policy" of the aggregation policy tables 80-1 and 80-2, and "○" and "x" of the "selected state" of the aggregation policy table 80-2 are rewritten such that the newly generated table is selected.

As described above, upon detecting that the "selected state" of the distribution policy tables 70-1 and 70-2 and the aggregation policy tables 80-1 and 80-2 is rewritten, the management units 41-1 and 41-2 of the distribution devices 4-1 and 4-2 newly refer to the table in which the item of "selected state" is "○", and output the information stored in the table to the distribution policy setting units 51-1 and 51-2 and the aggregation policy setting units 61-1 and 61-2 corresponding to the table. Thus, the new distribution policy information is set in the data distribution units 53-1 and 53-2, and the new aggregation policy information is set in the data aggregation units 63-1 and 63-2.

Consequently, the user of the calculation device 6-1 and the service provider which is the operator of the service providing device 3 becomes able to apply the distribution policy and the aggregation policy explicitly indicating the communication protocol and communication timing to the distribution devices 4-1 and 4-2.

(Cooperation Between Distribution Policy and Aggregation Policy)

In the first embodiment described above, there is no cooperation between the distribution policy information set in the data distribution unit 53-1 of the distribution device 4-1 and the aggregation policy information set in the data aggregation unit 63-2 of the distribution device 4-2, and each piece of information is independently set. On the other hand, for example, the time slot of the "transmission time" of the time division transmission table 71-1 of the distribution device 4-1 and the time slot of the "reception time" of the time division reception table 81-2 of the distribution device 4-2 are matched in advance, and in a case where the time division transmission is selected in the distribution policy table 70-1 of the distribution device 4-1, the management unit 41-1 of the distribution device 4-1 transmits information indicating that the time division transmission is selected to the distribution device control device 2 via the communication unit 42-1. The distribution device control device 2 specifies the distribution device 4-1 that receives the data from the distribution device 4-2, and transmits an instruction signal for selecting time division reception to the specified distribution device 4-2. Upon receiving the instruction signal for selecting the time division reception via the communication unit 42-2, the management unit 41-2 of the distribution device 4-2 rewrites the item of "selected state" of the record of the time division reception to "○" in the item of "selected state" of the aggregation policy table 80-2, and rewrites the other items of the "selected state" to "x". After rewriting the aggregation policy table 80-2, the management unit 41-2 reads the aggregation policy information stored in the time division reception table 81-2, and writes and sets the read aggregation policy information in the internal storage area of the data aggregation unit 63-2 via the aggregation policy setting unit 61-2. Consequently, synchronous switching is performed in the distribution device 4-1 and the distribution device 4-2, and timely and efficient data transfer is performed.

Second Embodiment

Next, a second embodiment will be described. In the communication system 1 of the first embodiment, it is possible to secure a desired communication capacity for each service by using the line switching network 20. However, in the communication system 1, the end-to-end communication capacity between the service providing device 3 and the main devices 7-1 and 7-2 of the calculation devices 6-1 and 6-2 passes through the access network 10, and thus tends to be limited by the communication capacity of the access network 10. For example, in the access network 10, when access of a plurality of users is concentrated or a large amount of data is transferred, a communication capacity allocated to one user is reduced, and this reduced communication capacity becomes the end-to-end communication capacity between the service providing device 3 and the main devices 7-1 and 7-2 of the calculation devices 6-1 and 6-2. In the second embodiment, in view of the fact that most of the transmission of the large amount of data is performed between the service providing device 3 and the main devices 7-1 and 7-2, the following configuration is provided.

Figure 10:
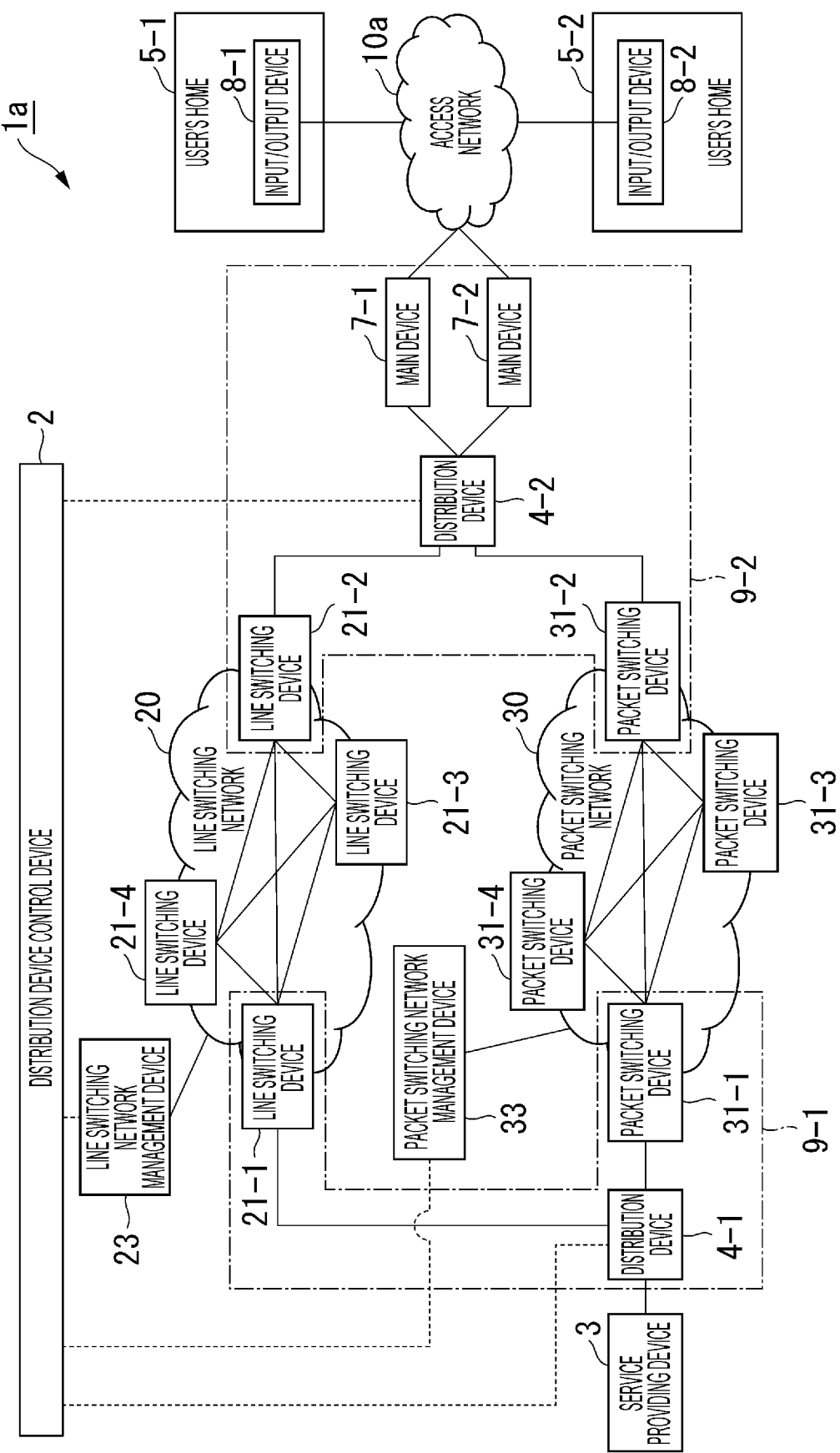
FIG. 10 is a block diagram illustrating a configuration of a communication system of a second embodiment.
Figure 11:
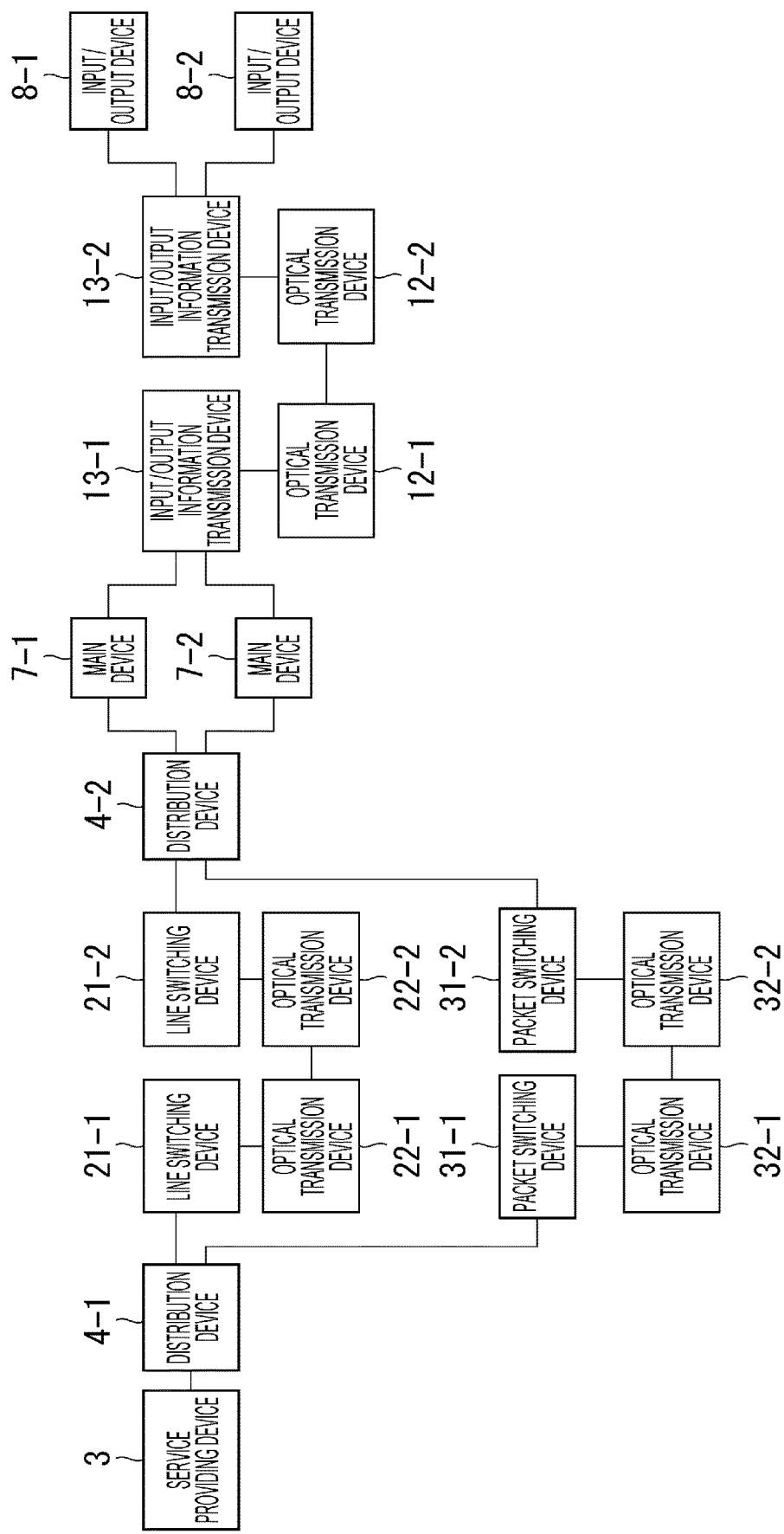
FIG. 11 is a block diagram illustrating a connection configuration of the communication system of the second embodiment.

FIG. 10 is a block diagram illustrating a configuration of a communication system 1a of the second embodiment. FIG. 11 is a diagram illustrating a connection configuration from the service providing device 3 to the input/output devices 8-1 and 8-2 in the communication system 1a of the second embodiment. In the second embodiment, the same components as those in the first embodiment are denoted by the same reference numerals, and different components will be described below. The communication system 1a includes the distribution device control device 2, the service providing device 3, the distribution devices 4-1 and 4-2, the main devices 7-1 and 7-2, the input/output devices 8-1 and 8-2, an access network 10a, the line switching network 20, and the packet switching network 30.

The main device 7-1 and the input/output device 8-1 are the devices included in the calculation device 6-1 in the first embodiment, and the main device 7-2 and the input/output device 8-2 are the devices included in the calculation device 6-2 in the first embodiment. In the second embodiment, the main devices 7-1 and 7-2 are installed in the base 9-2. The input/output device 8-1 is installed in the user's home 5-1, and the input/output device 8-2 is installed in the user's home 5-2.

As illustrated in FIG. 11, the access network 10*a* includes input/output information transmission devices 13-1 and 13-2 and the optical transmission devices 12-1 and 12-2. Each of the optical transmission devices 12-1 and 12-2 is connected to each of the input/output information transmission devices 13-1 and 13-2, and an optical path is set between the optical transmission devices 12-1 and 12-2, so that the input/output information transmission devices 13-1 and 13-2 are connected.

An output unit such as a display included in the input/output devices 8-1 and 8-2 and the main devices 7-1 and 7-2 are generally connected by an interface standard for transmitting a video signal including an audio signal such as High-Definition Multimedia Interface (HDMI (registered trademark)), Digital Visual Interface (DVI), or Displayport. The input units such as a keyboard and a mouse included in the input/output devices 8-1 and 8-2 and the main devices 7-1 and 7-2 are generally connected by an interface standard such as a universal serial bus (USB). Note that each of the input/output devices 8-1 and 8-2 and each of the main devices 7-1 and 7-2 may be connected by an individual physical interface such as HDMI (registered trademark) or USB as described above, or may be connected by one physical interface capable of transmitting a USB signal such as USB Type-C and a video signal.

These interface standards do not allow long-distance transmission, and it becomes difficult to maintain signal quality in long-distance transmission. The input/output information transmission devices 13-1 and 13-2 are devices that maintain signal quality and enable transmission and reception of data between the main devices 7-1 and 7-2 and the input/output devices 8-1 and 8-2 even when the distance between the main devices 7-1 and 7-2 and the input/output devices 8-1 and 8-2 is about several kilometers. An example of such a device is ATEN KVM extender. However, since such a device can only transmit and receive a band of about 10 gigabits at the maximum, the input/output information transmission devices 13-1 and 13-2 can further convert data to be transferred into a signal format in an optical path, for example, 100 G Ethernet (registered trademark), an optical data unit (ODU), or the like, and transfer the data through the optical path. Thus, the input/output information transmission devices 13-1 and 13-2 transmit data transmitted and received between the main devices 7-1 and 7-2 and the input/output devices 8-1 and 8-2 through the optical path between the optical transmission devices 12-1 and 12-2 connected respectively thereto, so that the distance between the main devices 7-1 and 7-2 and the input/output devices 8-1 and 8-2 can be set to a long distance of several km or more.

(Data Distribution Processing by Communication System of Second Embodiment)

Similarly to the first embodiment, also in the second embodiment, processing in a case where a service providing device 3 transmits data using two types of protocols, http and ftp, with the transmission destination address being the address information added in advance to the main device 7-1 will be described. Here, it is assumed that, for example, downloaded data such as a software program is transmitted using the ftp protocol, and website data is transmitted using the http protocol.

Figure 12:
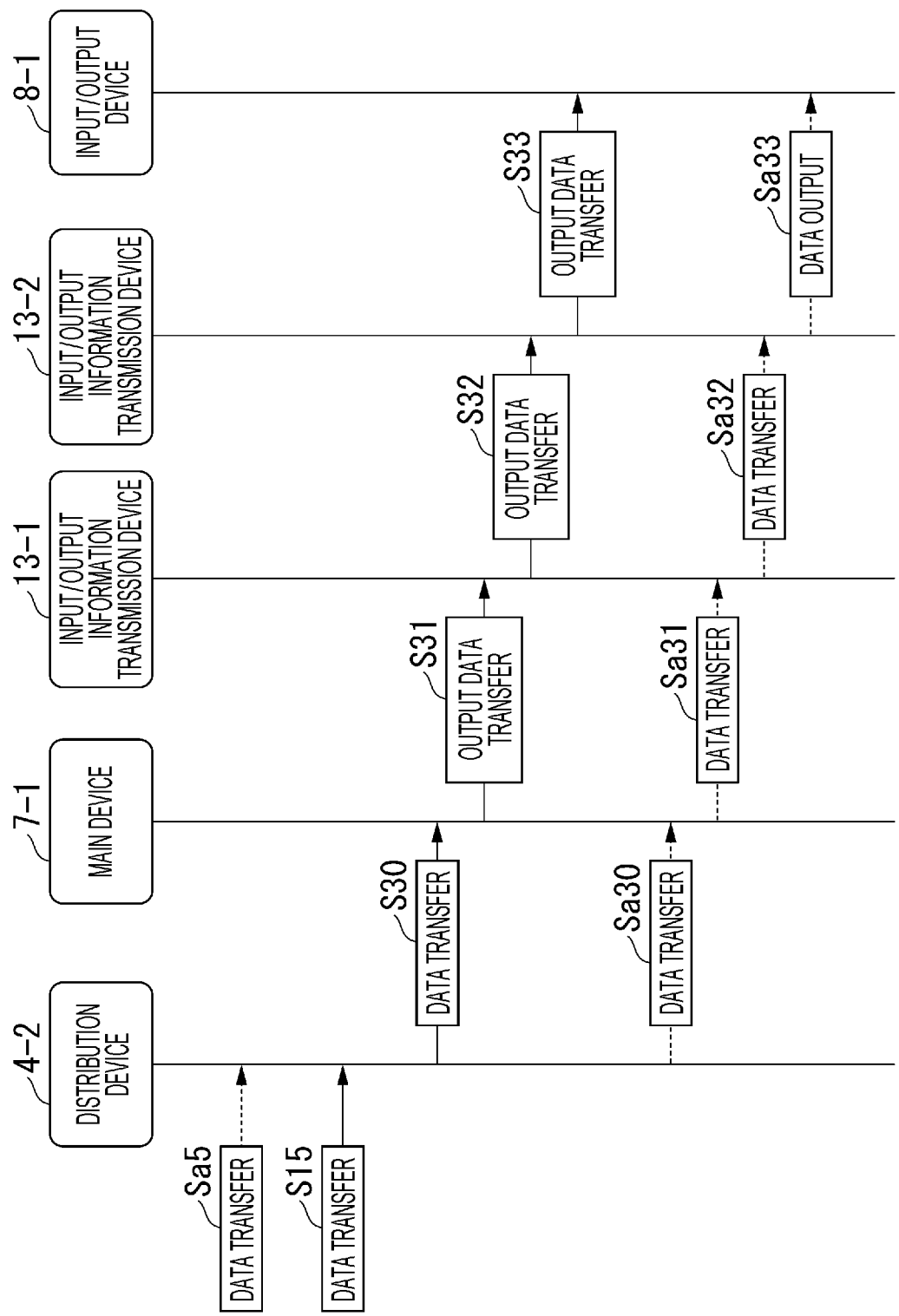
FIG. 12 is a sequence diagram illustrating a flow of processing by the communication system of the second embodiment.

Processing until the data transmitted by the service providing device 3 reaches the distribution device 4-1 via the distribution device 4-2 is the same as the processing in the first embodiment illustrated in FIG. 6. FIG. 12 is a sequence diagram illustrating processing until the data transmitted by the distribution device 4-2 reaches the input/output device 8-1.

(Transfer of Data of Ftp)

Similarly to the first embodiment, it is assumed that the aggregation policy information stored in the selective reception table 83-2 is written and set in the internal storage area of the data aggregation unit 63-2 of the distribution device 4-2. The data aggregation unit 63-2 refers to the item of "priority" of the aggregation policy information stored in the internal storage area, refers to the record in which the "priority" is "high", and detects the "line switching network" in the item of "switching network type" and the "data capturing unit A" in the item of "capturing source". Here, the "data capturing unit A" is the data capturing unit 62A-2 in the distribution device 4-2.

The data aggregation unit 63-2 reads the data of ftp received and captured by the data capturing unit 62A-2 from the line switching device 21-2, and outputs the read data of ftp to the data output unit 64-2. The data output unit 64-2 captures the data of ftp output from the data aggregation unit 63-2, and transmits the captured data of ftp to the main device 7-1 (FIG. 12: step S30). Upon receiving the data of ftp from the distribution device 4-2, the main device 7-1 writes and stores the received data of ftp in an internal storage area, and transmits output data to be output by an output unit of the input/output device 8-1, for example, data indicating a reception progress of the data of ftp, to the input/output information transmission device 13-1 (FIG. 12: step S31).

The input/output information transmission device 13-1 receives the data indicating the reception progress of the ftp data transmitted by the main device 7-1, and transfers the received data to the input/output information transmission device 13-2 (FIG. 12: step S32). The input/output information transmission device 13-2 receives the data transmitted by the input/output information transmission device 13-1 and transmits the received data to the input/output device 8-1 (FIG. 12: step S33). The input/output device 8-1 receives the data transmitted by the input/output information transmission device 13-2. The output unit of the input/output device 8-1, for example, the display, displays data indicating the reception progress of the ftp data on the screen.

(Transfer of Http Data)

When the data aggregation unit 63-2 of the distribution device 4-2 has read all the data received and captured by the data capturing unit 62A-2 from the line switching device 21-2, next, the data aggregation unit 63-2 refers to the record in which the "priority" of the aggregation policy information stored in the internal storage area is "low", and detects the "packet switching network" of the item of "switching network type" and the "data capturing unit B" of the item of "capturing source". Here, the "data capturing unit B" is a data capturing unit 62B-2 in the distribution device 4-2.

The data aggregation unit 63-2 reads the http data that the data capturing unit 62B-2 receives from the packet switching device 31-2 and captures, and outputs the read http data to the data output unit 64-2. The data output unit 64-2 captures the http data output from the data aggregation unit 63-2 and transmits the captured http data to the main device 7-1 (FIG. 12: step Sa30). Upon receiving the http data from the distribution device 4-2, the main device 7-1 transmits the http data to the input/output information transmission device 13-1 (FIG. 12: step Sa31).

The input/output information transmission device 13-1 receives the http data transmitted by the main device 7-1, and transfers the received data to the input/output information transmission device 13-2 (FIG. 12: step Sa32). The input/output information transmission device 13-2 receives the data transmitted by the input/output information transmission device 13-1 and transmits the received data to the input/output device 8-1 (FIG. 12: step Sa33). The input/output device 8-1 receives the http data transmitted by the input/output information transmission device 13-2. The output unit of the input/output device 8-1, for example, the display displays http data on the screen.

With the configuration of the second embodiment described above, by installing the main device 7-1 in the base 9-2 where the distribution device 4-2 is installed, it is possible to prevent the traffic of transfer of a large amount of data such as downloaded data and uploaded data from being generated in the access network 10*a*. The large amount of data is transferred at a communication speed corresponding to a communication capacity allocated between the service providing device 3 and the main device 7-1. Thus, for example, by generating a line having a large communication capacity in the line switching network 20, it is possible to transmit the large amount of data from the service providing device 3 to the main device 7-1 in a short time. In a case where the communication capacity of the packet switching network 30 is sufficient, even if the large amount of data is transferred via the packet switching network 30, the end-to-end communication capacity is the communication capacity allocated in the packet switching network 30 and is not rate-limited by the communication capacity of the access network 10*a*, and thus it is possible to transmit data from the service providing device 3 to the main device 7-1 in a short time.

The access network 10*a* transfers data having a relatively small data capacity regarding input and output, such as data indicating a reception progress of the ftp data and data of a website. Thus, a large delay does not occur in the access network 10*a*, and stable data transfer processing is performed.

In the access network 10*a* of the second embodiment and the access network 10 of the first embodiment, the input/output information transmission device 13-1 and the input/output information transmission device 13-1 as well as the access transmission device 11-1 and the access transmission device 11-2 are connected via the optical transmission devices 12-1 and 12-2, but the connection is not limited to the optical transmission line and may be made via a metal line or radio. In addition, the connection may be made via a plurality of transmission media such as the optical transmission line and radio.

Note that, also in the second embodiment described above, similarly to the first embodiment, positions of transmission and reception in the service providing device 3 and the main device 7-1 may be switched. In this case, the distribution device 4-2 performs processing of distributing and transmitting the data on the basis of the distribution policy information, and the distribution device 4-1 performs processing of capturing the received data on the basis of the aggregation policy information.

Furthermore, a communication system in which the communication system 1 of the first embodiment and the communication system 1*a* of the second embodiment are mixed may be configured. Furthermore, the communication system 1 of the first embodiment and the communication system 1*a* of the second embodiment may include two or more line switching networks 20 and two or more packet switching networks 30. In this case, the distribution device 4 includes a plurality of data output units 54A, 54B, and 54C, . . . and a plurality of data capturing units 62A, 62B, and 62C, . . . corresponding to the number of line switching networks 20 and the number of packet switching networks 30, and the distribution devices 4-1 and 4-2 installed in the bases 9-1 and 9-2 are connected to each of the plurality of line switching networks 20 and the plurality of packet switching networks 30. In addition, in the tables illustrated in FIGS. 4(*b*), 4(*c*), 5(*b*), 5(*c*), and 5(*d*), it is possible to set records according to the number of the line switching networks 20 and the number of the packet switching networks 30, for example, in the information type transmission table 72 in FIG. 4(*c*), by assigning different protocol types to each of the plurality of line switching networks 20 and the plurality of packet switching networks 30, it is possible to distribute and transmit data to switching networks which are different for each protocol (here, the switching networks are the plurality of line switching networks 20 and the plurality of packet switching networks 30).

In addition, when there is a plurality of line switching networks 20 as described above, one data output unit 54A may be provided instead of providing the data output unit 54A for each of the plurality of line switching networks 20, and the data output unit 54A may select any one of the plurality of line switching networks 20 as a connection destination and connect the connection destination. In this case, when the line is disconnected, the line generated in any one of the plurality of line switching networks 20 may be maintained, and only the connection between the data output unit 54A and the line switching network 20 being connected may be disconnected. In this manner, when the data output unit 54A is connected to the line switching network 20 again, it is possible to reuse a generated line in the line switching network 20. In addition, in a case where the plurality of packet switching networks 30 is present as described above, one data output unit 54B may be provided instead of providing the data output unit 54B for each of the plurality of packet switching networks 30, and the data output unit 54B may select any one of the plurality of packet switching networks 30 as a connection destination and connect the connection destination.

Third Embodiment

Figure 13:
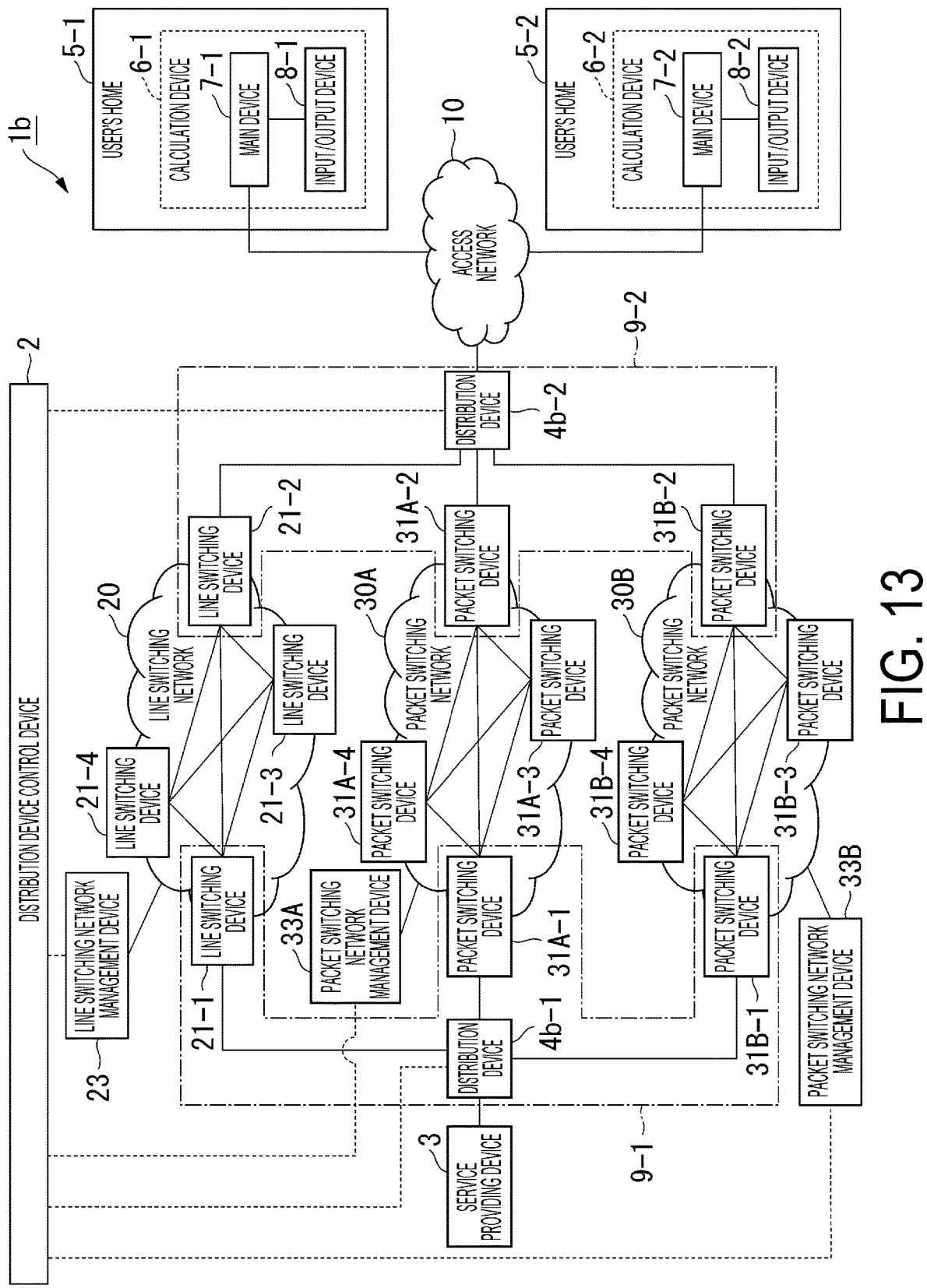
FIG. 13 is a block diagram illustrating a configuration of a communication system of a third embodiment.

FIG. 13 is a block diagram illustrating a configuration of a communication system 1*b* of the third embodiment. In the third embodiment, the same components as those of the first embodiment are denoted by the same reference numerals, and different components will be described below. The communication system 1*b* includes the distribution device control device 2, the service providing device 3, distribution devices 4*b*-1 and 4*b*-2, the calculation devices 6-1 and 6-2, the access network 10, the line switching network 20, and packet switching networks 30A and 30B. The calculation devices 6-1 and 6-2 are installed in the user's homes 5-1 and 5-2.

Each of the packet switching networks 30A and 30B has the same configuration as the packet switching network 30 of the first embodiment. Thus, in the packet switching networks 30A and 30B, in a case where a functional unit corresponding to a functional unit included in the packet switching network 30 is indicated, reference numerals of the functional unit included in the packet switching network 30 are denoted with reference numeral "A" or "B" added. For example, in a case where the packet switching network management device 33 in the packet switching network 30A is illustrated, the packet switching network management device 33A is assumed to be illustrated.

The distribution devices 4*b*-1 and 4*b*-2 have the same configuration. Hereinafter, the distribution devices 4*b*-1 and 4*b*-2 are referred to as a distribution device 4*b*, and the internal configuration of the distribution device 4*b* will be described with reference to FIG. 14. The distribution device 4*b* includes the management unit 41, the communication unit 42, a distribution policy-aggregation policy information storage unit 43*b*, the distribution policy setting unit 51, the data capturing unit 52, the data distribution unit 53, the data output units 54A, 54B, and 54C, the aggregation policy setting unit 61, data capturing units 62A, 62B, and 62C, the data aggregation unit 63, the data output unit 64, and a comparison information storage unit 44.

In a case of the distribution device 4*b*-1 installed in the base 9-1, the data output unit 54B is connected to a packet switching device 31A-1 and transmits data to the packet switching device 31A-1. In a case of the distribution device 4*b*-2 installed in the base 9-2, the data output unit 54B is connected to a packet switching device 31A-2 and transmits data to the packet switching device 31A-2.

In the case of the distribution device 4*b*-1 installed in the base 9-1, the data output unit 54C is connected to a packet switching device 31B-1 and transmits data to the packet switching device 31B-1. In the case of the distribution device 4*b*-2 installed in the base 9-2, the data output unit 54C is connected to a packet switching device 31B-2 and transmits data to the packet switching device 31B-2.

In the case of the distribution device 4*b*-1 installed in the base 9-1, the data capturing unit 62B is connected to the packet switching device 31A-1 and receives and captures data transmitted by the packet switching device 31A-1. In the case of the distribution device 4*b*-2 installed in the base 9-2, the data capturing unit 62B is connected to the packet switching device 31A-2 and receives and captures data transmitted by the packet switching device 31A-2.

In the case of the distribution device 4*b*-1 installed in the base 9-1, the data capturing unit 62C is connected to the packet switching device 31B-1 and receives and captures data transmitted by the packet switching device 31B-1. In the case of the distribution device 4*b*-2 installed in the base 9-2, the data capturing unit 62C is connected to the packet switching device 31B-2 and receives and captures data transmitted by the packet switching device 31B-2.

Note that the connection destinations of the data capturing unit 52, the data output unit 54A, the data capturing unit 62A, and the data output unit 64 are the same as those of the distribution device 4 of the first embodiment.

The distribution policy-aggregation policy information storage unit 43*b* stores in advance the distribution policy table 70 in which the information type transmission illustrated in FIG. 4(*a*) is selected and the information type transmission table 72*b* illustrated in FIG. 15. The distribution policy-aggregation policy information storage unit 43*b* stores in advance the aggregation policy table 80 illustrated in FIG. 5(*a*) and the simultaneous reception table 82*b* illustrated in FIG. 16. However, in the third embodiment, it is assumed that simultaneous reception of the items of the "selected state" of the aggregation policy table 80 is "○", and other items are "x".

The information type transmission table 72*b* illustrated in FIG. 15 includes items of "selection condition", "protocol type", "switching network type", "output destination", "transmission destination information", and "line identification information". In the item of "selection condition", information indicating a selection condition in a case where a plurality of output destinations exists for one protocol type is written. Information written in the items of "protocol type", "switching network type", "output destination", "transmission destination information", and "line identification information" is similar to that in the information type transmission table 72 of the first embodiment. However, in the communication system 1*b*, since the line switching network 20 and the two packet switching networks 30A and 30B exist, three of "line switching network" corresponding to the line switching network 20, "packet switching network A" corresponding to the packet switching network 30A, and "packet switching network B" corresponding to the packet switching network 30B are written in the "switching network type". Correspondingly, three of "data output unit A", "data output unit B", and "data output unit C" are also written in the item of "output destination". Here, the "data output unit A" corresponds to the data output unit 54A, the "data output unit B" corresponds to the data output unit 54B, and the "data output unit C" corresponds to the data output unit 54C.

In the information type transmission table 72*b*, two switching network types, that is, "packet switching network A" and "packet switching network B" and two output destinations, that is, "data output unit B" and "data output unit B" are associated with the protocol type of "http".

The simultaneous reception table 82*b* illustrated in FIG. 16 includes items of "switching network type" and "capturing source". Information written in the items of "switching network type" and "capturing source" is similar to that in the simultaneous reception table 82 of the first embodiment. However, in the communication system 1*b*, since the line switching network 20 and the two packet switching networks 30A and 30B exist, three of "line switching network" corresponding to the line switching network 20, "packet switching network A" corresponding to the packet switching network 30A, and "packet switching network B" corresponding to the packet switching network 30B are written in the "switching network type". Correspondingly, three "data capturing unit A", "data capturing unit B", and "data capturing unit C" are also written in the item of "capturing source". Here, the "data capturing unit A" corresponds to the data capturing unit 62A, the "data capturing unit B" corresponds to the data capturing unit 62B, and the "data capturing unit C" corresponds to the data capturing unit 62C.

The comparison information storage unit 44 stores the usage rate table 75 illustrated in FIG. 17. The usage rate table 75 includes items of "output destination" and "usage rate". In the item of "output destination", information indicating an output destination to which the data distribution unit 53 outputs data is written. In the item of "usage rate", a numerical value indicating the usage rate in the switching network connected to the functional unit of the output destination written in the item of "output destination" is written, for example, in units of percentages. Note that FIG. 17 illustrates, as an example, an example in which "data output unit B" and "data output unit C" are written in the item of "output destination". As described above, the "data output unit B" corresponds to the data output unit 54B, and the "data output unit C" corresponds to the data output unit 54C. Thus, 90% in the first row of the item "usage rate" indicates the usage rate in the packet switching network 30A connected to the data output unit 54B, and 50% in the second row indicates the usage rate in the packet switching network 30B connected to the data output unit 54C.

Note that, in the following description, in a case where the internal configuration of each of the distribution devices 4*b*-1 and 4*b*-2 is illustrated, "-1" and "-2" as branch numbers of the reference numerals of the distribution devices 4*b*-1 and 4*b*-2 are attached to the reference numerals of the respective functional units included in the distribution device 4b, and for example, in a case where the management unit 41 of the distribution device 4b-1 is illustrated, the management unit 41 is illustrated as the management unit 41-1.

(Data Distribution Processing by Communication System of Third Embodiment)

Figure 18:
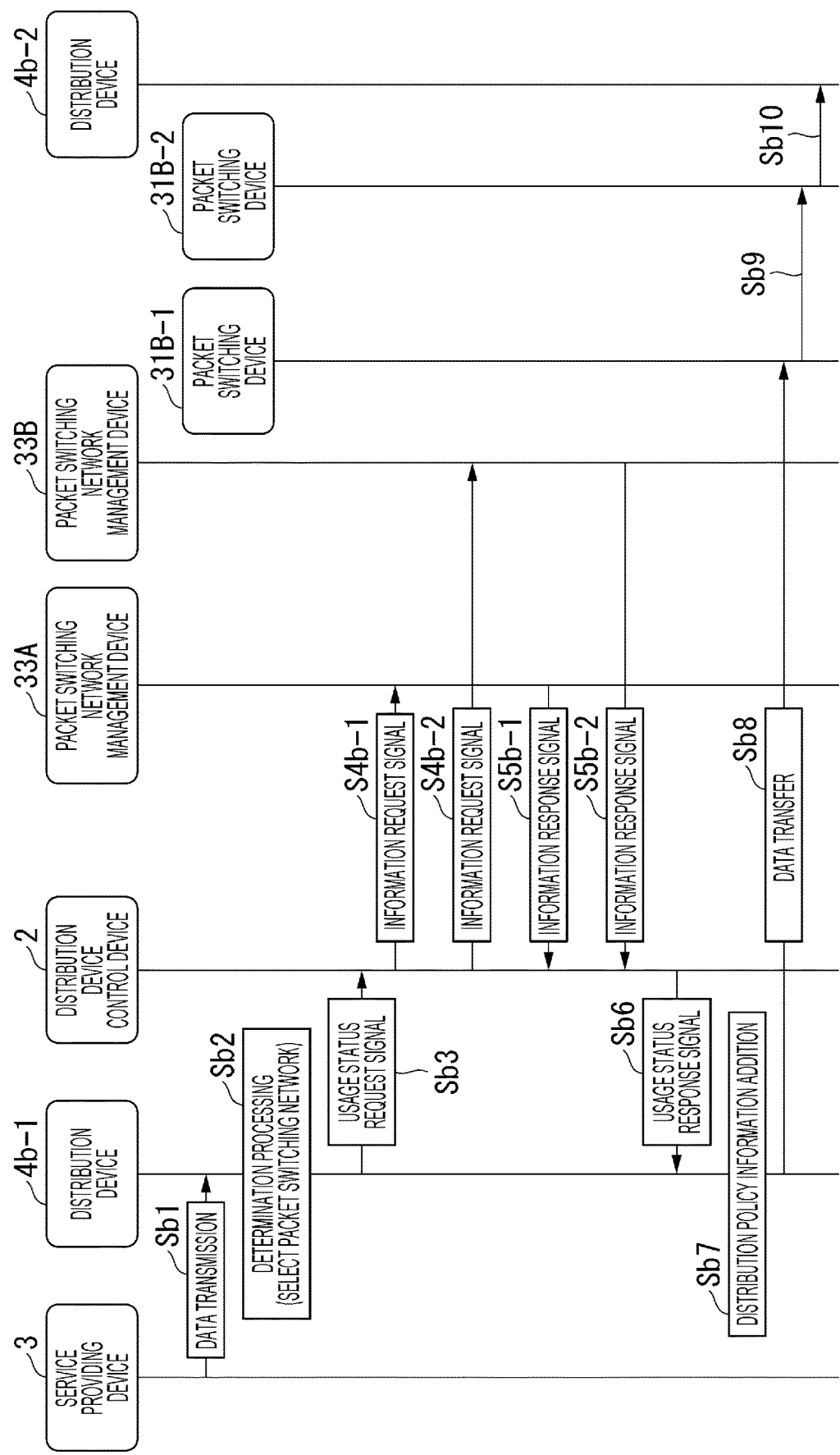
FIG. 18 is a sequence diagram illustrating a flow of processing by the communication system of the third embodiment.

Next, data distribution processing by the communication system 1b will be described with reference to FIGS. 18 and 19. FIG. 18 is a sequence diagram illustrating a flow of data distribution processing by the communication system 1b.

Similarly to the first and second embodiments, also in the third embodiment, a case where a service providing device 3 transmits data with the transmission destination address being the address information added in advance to the main device 7-1 will be described.

In the distribution policy-aggregation policy information storage units 43b-1 of the distribution devices 4b-1 and 4b-2, tables having the same contents as the distribution policy table 70 illustrated in FIG. 4(a), the information type transmission table 72b illustrated in FIG. 15, and the aggregation policy table 80 illustrated in FIG. 5(a) and the simultaneous reception table 82b illustrated in FIG. 16 are stored in advance. However, as described above, regarding the items of "selected state" of the aggregation policy table 80, simultaneous reception is "○", and other items are "x".

Therefore, when the distribution devices 4b-1 and 4b-2 are activated, the distribution policy information stored in the information type transmission tables 72b-1 and 72b-2 is written in the internal storage areas of the data distribution units 53-1 and 53-2 by the management units 41-1 and 41-2, the distribution policy setting units 51-1 and 51-2, and the aggregation policy setting units 61-1 and 61-2, and the aggregation policy information stored in the simultaneous reception tables 83b-1 and 83b-2 is written in the internal storage areas of the data aggregation units 63-1 and 63-2. As described above, the distribution policy information stored in the internal storage area of the data distribution unit 53-1 of the distribution device 4b-1 has the same content as the information stored in the information type transmission table 72b illustrated in FIG. 15. Thus, in the third embodiment, in the determination processing of step Sb2 in FIG. 18, processing in which the processing of step T3 in the flowchart illustrated in FIG. 8 is replaced with a subroutine of packet switching network selection processing illustrated in FIG. 19 is performed.

(Case where Predetermined Protocol of Data is "ftp")

The service providing device 3 generates data to be transmitted to the calculation device 6-1 according to the ftp protocol, and adds address information added in advance to the main device 7-1 of the calculation device 6-1 for the generated ftp data to the data as the transmission destination address. The service providing device 3 transmits the data to which the transmission destination address is added to the distribution device 4b-1 (FIG. 18: step Sb1). Upon receiving the data from the service providing device 3, the distribution device 4b-1 performs determination processing of distributing the data on the basis of the distribution policy information stored in the internal storage area (FIG. 18: step Sb2). The data capturing unit 52-1 of the distribution device 4b-1 receives and captures data transmitted by the service providing device 3. The data capturing unit 52-1 outputs the captured data to the data distribution unit 53-1 (FIG. 8: step T1). The data distribution unit 53-1 determines that the protocol type of the captured data is "ftp" (FIG. 8: step T2, ftp). The data distribution unit 53-1 refers to the distribution policy information stored in the internal storage area, and detects that there is one record for the protocol type "ftp". Since there is one record for the protocol type "ftp", the processing after step T4 in FIG. 8 and the processing after step S3 in FIG. 6 are performed as in the first embodiment.

(Case where Predetermined Protocol of Data is "http")

The service providing device 3 generates data to be transmitted to the calculation device 6-1 according to the http protocol, and adds address information added in advance to the main device 7-1 of the calculation device 6-1 for the generated http data to the data as the transmission destination address. The service providing device 3 transmits the data to which the transmission destination address is added to the distribution device 4b-1 (FIG. 18: step Sb1).

Upon receiving the data from the service providing device 3, the distribution device 4b-1 performs determination processing of distributing the data on the basis of the distribution policy information stored in the internal storage area (FIG. 18: step Sb2).

The data capturing unit 52-1 of the distribution device 4b-1 receives and captures data transmitted by the service providing device 3. The data capturing unit 52-1 outputs the captured data to the data distribution unit 53-1 (FIG. 8: step T1). The data distribution unit 53-1 determines that the protocol type of the captured data is "http" (FIG. 8: step T2, http).

The data distribution unit 53-1 refers to the distribution policy information stored in the internal storage area, and detects that "data output unit B" and "data output unit C" exist in the item of "output destination" with respect to the protocol type "http", and further, a condition of "low usage rate" is indicated in the item of "selection condition". At this time point, the distribution policy information stored in the internal storage area of the data distribution unit 53-1 does not include the information regarding the usage rate corresponding to the "data output unit B" and the "data output unit C". Thus, the data distribution unit 53-1 requests the management unit 41-1 to acquire information regarding the usage rate of the "packet switching network A" in the item of "switching network type" corresponding to the "data output unit B", that is, the packet switching network 30A the "packet switching network B" in the item of "switching network type" corresponding to the "data output unit C", that is, the packet switching network 30B.

It is assumed that the management unit 41-1 receives a request for acquiring information of the usage rates of the packet switching network 30A and the packet switching network 30B from the data distribution unit 53-1. In this case, the management unit 41-1 transmits a usage status request signal including information indicating to acquire the information of the usage rates of the packet switching network 30A and the packet switching network 30B to the distribution device control device 2 via the communication unit 42-1 (FIG. 19: step T31). Note that the processing of step T31 in FIG. 19 corresponds to the processing of step Sb3 in FIG. 18.

Upon receiving the usage status request signal from the distribution device 4b-1, the distribution device control device 2 reads the information indicating to acquire the information of the usage rates of the packet switching network 30A and the packet switching network 30B included in the received usage status request signal. The distribution device control device 2 transmits an information request signal for requesting the usage rate to the packet switching network management device 33A and the packet switching network management device 33B (FIG. 18: steps Sb4-1 and Sb4-2).

The packet switching network management device 33A transmits an information response signal including the collected information of the usage rate of the packet switching network 30A to the distribution device control device 2 (step Sb5-1 in FIG. 18). The packet switching network management device 33B transmits an information response signal including the collected information of the usage rate of the packet switching network 30B to the distribution device control device 2 (step Sb5-2 in FIG. 18).

When receiving the information response signals from the packet switching network management devices 33A and 33B, the distribution device control device 2 reads the usage rate included in each of the received information response signals. The distribution device control device 2 transmits a usage status response signal including the information of the usage rate of the packet switching network 30A and the information of the usage rate of the packet switching network 30B to the distribution device 4b-1 (FIG. 18: step Sb6).

Figures 19, 20:
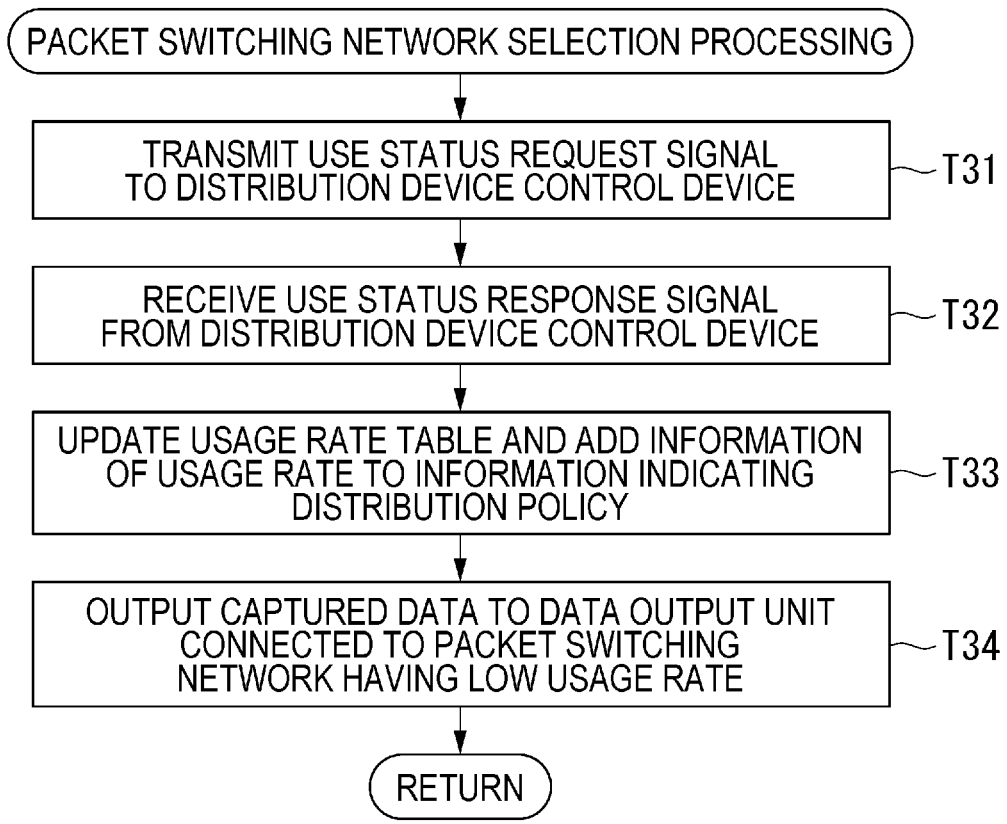
FIG. 19 is a flowchart of a subroutine performed in a process by the distribution device of the third embodiment.
FIG. 20 is a diagram illustrating a data configuration of a charge type table stored in a comparison information storage unit of a distribution device of the third embodiment.

The management unit 41-1 of the distribution device 4b-1 receives the usage status response signal from the distribution device control device 2 via the communication unit 42-1 (FIG. 19: step T32). The management unit 41-1 reads the information of the usage rate of the packet switching network 30A and the information of the usage rate of the packet switching network 30B included in the received usage status response signal. The management unit 41-1 writes the read information of the usage rate of the packet switching network 30A and the read information of the usage rate of the packet switching network 30B in the usage rate table 75-1 of the comparison information storage unit 44-1 to update the usage rate table 75-1.

The management unit 41-1 reads the information stored in the usage rate table 75-1 as distribution policy information to be added, and outputs the read information to the distribution policy setting unit 51-1. The distribution policy setting unit 51-1 captures the information output by the management unit 41-1, and writes and stores the captured information in the internal storage area of the data distribution unit 53-1 as the distribution policy information to be added (FIG. 19: step T33). Note that the processing of steps T32 and T33 in FIG. 19 corresponds to the processing of step Sb7 in FIG. 18.

The data distribution unit 53-1 selects one of the data output unit 54B-1 and a data output unit 54C-1 having a lower usage rate with reference to the distribution policy information added to the internal storage area, and outputs the data captured from the data capturing unit 52-1 to the selected one. For example, in a case where the distribution policy information added to the internal storage area of the data distribution unit 53-1 has the same content as the information stored in the usage rate table 75 illustrated in FIG. 17, the data distribution unit 53-1 selects the data output unit 54C-1 with the usage rate of "50%". The data distribution unit 53-1 outputs the data captured from the data capturing unit 52-1 to the selected data output unit 54C-1. The data output unit 54C-1 captures the data output from the data distribution unit 53-1 and transmits the captured data to the packet switching device 31B-1 of the packet switching network 30B (FIG. 19: step T34). Note that the processing of step T34 in FIG. 19 corresponds to the processing of step Sb8 in FIG. 18. In steps Sb9 and Sb10, the same processing as in steps Sa4 and Sa5 of the first embodiment is performed by the packet switching devices 31B-1 and 31B-2 and the distribution device 4b-2.

The aggregation policy information stored in the internal storage area of the data aggregation unit 63-2 of the distribution device 4b-2 has the same content as the information stored in the simultaneous reception table 82b illustrated in FIG. 16. Thus, the data aggregation unit 63-2 of the distribution device 4b-2 reads, from a data capturing unit 62C-2, data received and captured by the data capturing unit 62C-2 from the packet switching device 31B-2, and outputs the read data to the data output unit 64-2. The data output unit 64-2 captures the data output from the data aggregation unit 63-2 and transmits the captured data to the access transmission device 11-1. In the subsequent processing, the same processing as the processing of steps S21 to S23 illustrated in FIG. 7 is performed by the access transmission devices 11-1 and 11-2, the main device 7-1, and the input/output device 8-1.

Note that, in the third embodiment described above, the "low usage rate" is designated in the item of "selection condition" of the information type transmission table 72b-1 stored in the distribution policy-aggregation policy information storage unit 43b-1 of the distribution device 4b-1, so that an output destination with a low usage rate is selected in a case where a plurality of output destinations exists. On the other hand, "high usage rate" may be designated in the item of "selection condition", and the data distribution unit 53b-1 may select an output destination with a high usage rate.

"Random" may be designated in the item of "selection condition", and the data distribution unit 53b-1 may internally generate a random number and randomly select an output destination on the basis of the value of the generated random number, for example. Note that, in a case where the output destination is randomly selected, the data distribution unit 53b-1 may select the output destination alone without making a request to the management unit 41-1. In this case, the distribution device 4b-1 does not need to include the comparison information storage unit 44, and does not need to perform the processing of step Sb3 in which the management unit 41-1 transmits the usage status request signal to the distribution device control device 2 and the subsequent processing of subroutines illustrated in steps Sb4-1 and Sb4-2 to Sb7 and FIG. 19.

In the third embodiment, when the distribution device 4b-1 receives data from the service providing device 3, the management unit 41-1 performs processing of updating the usage rate table 75-1 stored in the comparison information storage unit 44 of the distribution device 4b-1. On the other hand, for example, in a case where the management unit 41-1 periodically transmits the usage status request signal to the distribution device control device 2 to perform the processing of updating the usage rate table 75-1, when the management unit 41-1 receives a request for acquiring the information of the usage rate from the data distribution unit 53-1, the information stored in the usage rate table 75-1 at that time may be output to the distribution policy setting unit 51 as the distribution policy information to be added.

In the third embodiment, the communication system 1b includes the two packet switching networks 30A and 30B, but the communication system 1b may include three or more packet switching networks 30 to distribute data to the three or more packet switching networks 30 according to the usage rate. The communication system 1b may include a plurality of line switching networks 20 and distribute data to the plurality of line switching networks 20 according to the usage rate. Furthermore, the communication system 1b may include a plurality of packet switching networks 30 and a plurality of line switching networks 20, and distribute data to all these switching networks.

In the third embodiment described above, the type of the switching network of the line switching network 20 or one of the packet switching networks 30A and 30B is specified on the basis of the protocol type, and then, when there is a plurality of switching networks of the specified type, a switching network having a low usage rate among the plurality of switching networks is specified as the switching network to which data is transmitted. On the other hand, for example, a table of distribution policy for selecting one of the switching networks may be newly stored in the distribution policy-aggregation policy information storage unit 43b-1 on the basis of the usage rate, and the switching network having the lowest usage rate among the line switching network 20 and the packet switching networks 30A and 30B may be selected as the switching network to which data is transmitted.

Instead of the usage rate table 75, a charge type table 76 as illustrated in FIG. 20 is stored in the comparison information storage unit 44 of the distribution device 4b, and "low charge" is designated in "selection condition" of the information type transmission table 72b of FIG. 15. The information stored in the information type transmission table 72b and the information stored in the charge type table 76 may be written and stored in the internal storage area of the data distribution unit 53 as the distribution policy information, so that the data distribution unit 53 selects an output destination with a low charge and outputs the data to the selected output destination when there is a plurality of data output destinations.

Also in the third embodiment described above, similarly to the first and second embodiments, positions of transmission and reception in the service providing device 3 and the calculation device 6-1 may be switched. In this case, the distribution device 4b-2 performs processing of distributing and transmitting the data on the basis of the distribution policy information, and the distribution device 4b-1 performs processing of capturing the received data on the basis of the aggregation policy information.

(Another Configuration Example of Distribution Device)

Figure 21:
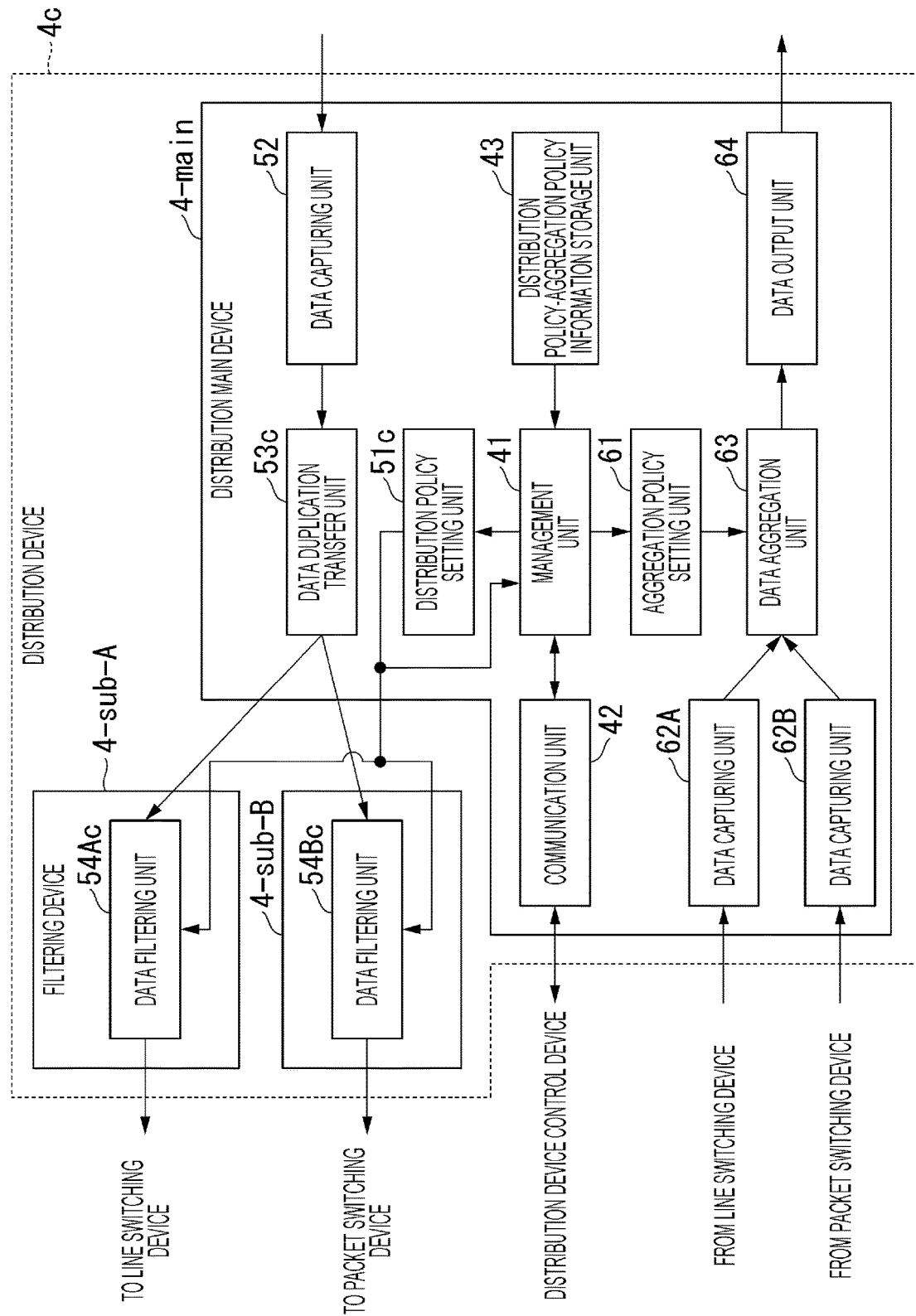
FIG. 21 is a block diagram illustrating another configuration example of the distribution device of the first and second embodiments.

FIG. 21 is a block diagram illustrating a configuration of a distribution device 4c of another configuration example of the distribution device 4. Note that, in the distribution device 4c, the same components as those of the distribution device 4 of the first embodiment are denoted by the same reference numerals, and different components will be described below.

The distribution device 4c includes a distribution main device 4-main, a filtering device 4-sub-A, and a filtering device 4-sub-B. The distribution main device 4-main includes the management unit 41, the communication unit 42, the distribution policy-aggregation policy information storage unit 43, a distribution policy setting unit 51c, the data capturing unit 52, the aggregation policy setting unit 61, the data capturing units 62A and 62B, the data aggregation unit 63, the data output unit 64, and a data duplication transfer unit 53c. The filtering devices 4-sub-A and 4-sub-B include data filtering units 54Ac and 54Bc, respectively.

In the distribution main device 4-main, the data duplication transfer unit 53c duplicates data captured from the data capturing unit 52, and transmits the duplicated data to the data filtering units 54Ac and 54Bc of the filtering devices 4-sub-A and 4-sub-B.

The data filtering unit 54Ac is connected to any one of the line switching devices 21-1 to 21-4, and for example, in a case where the distribution device 4c is installed in the base 9-1, the data filtering unit 54Ac is connected to the line switching device 21-1 installed in the base 9-1. The data filtering unit 54Bc is connected to any one of the packet switching devices 31-1 to 31-4, and for example, in a case where the distribution device 4c is installed in the base 9-1, the data filtering unit 54Bc is connected to the packet switching device 31-1 installed in the base 9-1.

The distribution policy setting unit 51c writes and sets distribution policy information in which the item of "switching network type" is "line switching network" among pieces of the distribution policy information output by the management unit 41 in an internal storage area of the data filtering unit 54Ac. The distribution policy setting unit 51c writes and sets distribution policy information in which the item of "switching network type" is "packet switching network" among pieces of the distribution policy information output by the management unit 41 in an internal storage area of the data filtering unit 54Bc.

Upon receiving the data transmitted by the data duplication transfer unit 53c, the data filtering units 54Ac and 54Bc refer to the distribution policy information stored in the internal storage area, output data that matches the condition of the distribution policy information, and discard data that does not match the condition of the distribution policy information.

Figure 3:
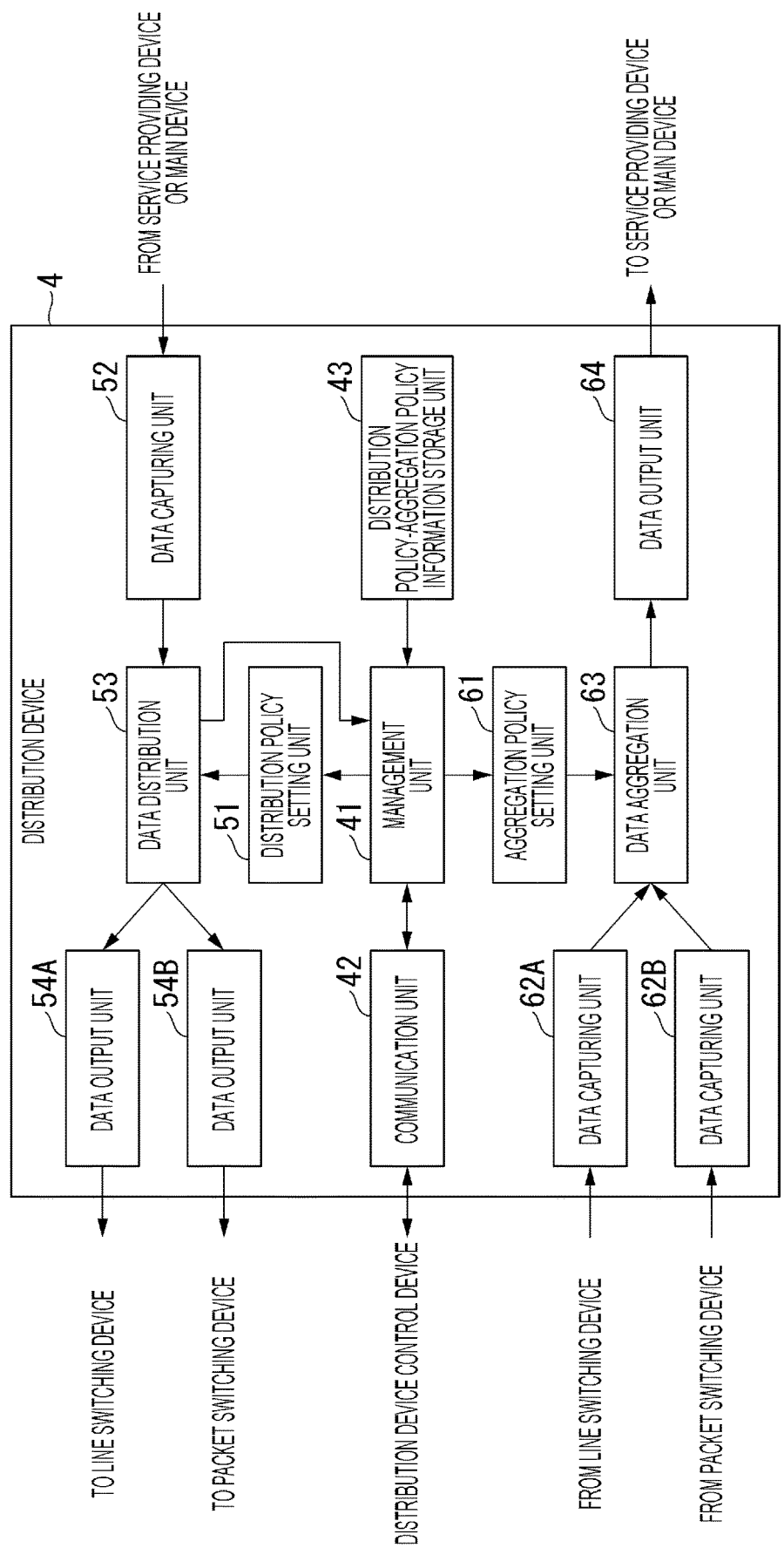
FIG. 3 is a block diagram illustrating an internal configuration of a distribution device of the first embodiment.

In the distribution device 4 illustrated in FIG. 3, the data distribution unit 53 of the distribution device 4 performs processing of distributing the data captured from the data capturing unit 52 to the data output unit 54A or the data output unit 54B on the basis of the distribution policy information stored in the internal storage area. On the other hand, in the distribution device 4c, the distribution main device 4-main duplicates and transfers the data to be transferred to the number corresponding to the number of filtering devices 4-sub-A and 4-sub-B. The filtering devices 4-sub-A and 4-sub-B filter the data transmitted by the distribution main device 4-main according to the distribution policy information set in each of the filtering devices 4-sub-A and 4-sub-B, and transmit only the data matching the condition of the distribution policy information. Thus, the distribution device 4c achieves the same effect as the distribution device 4.

Figure 14:
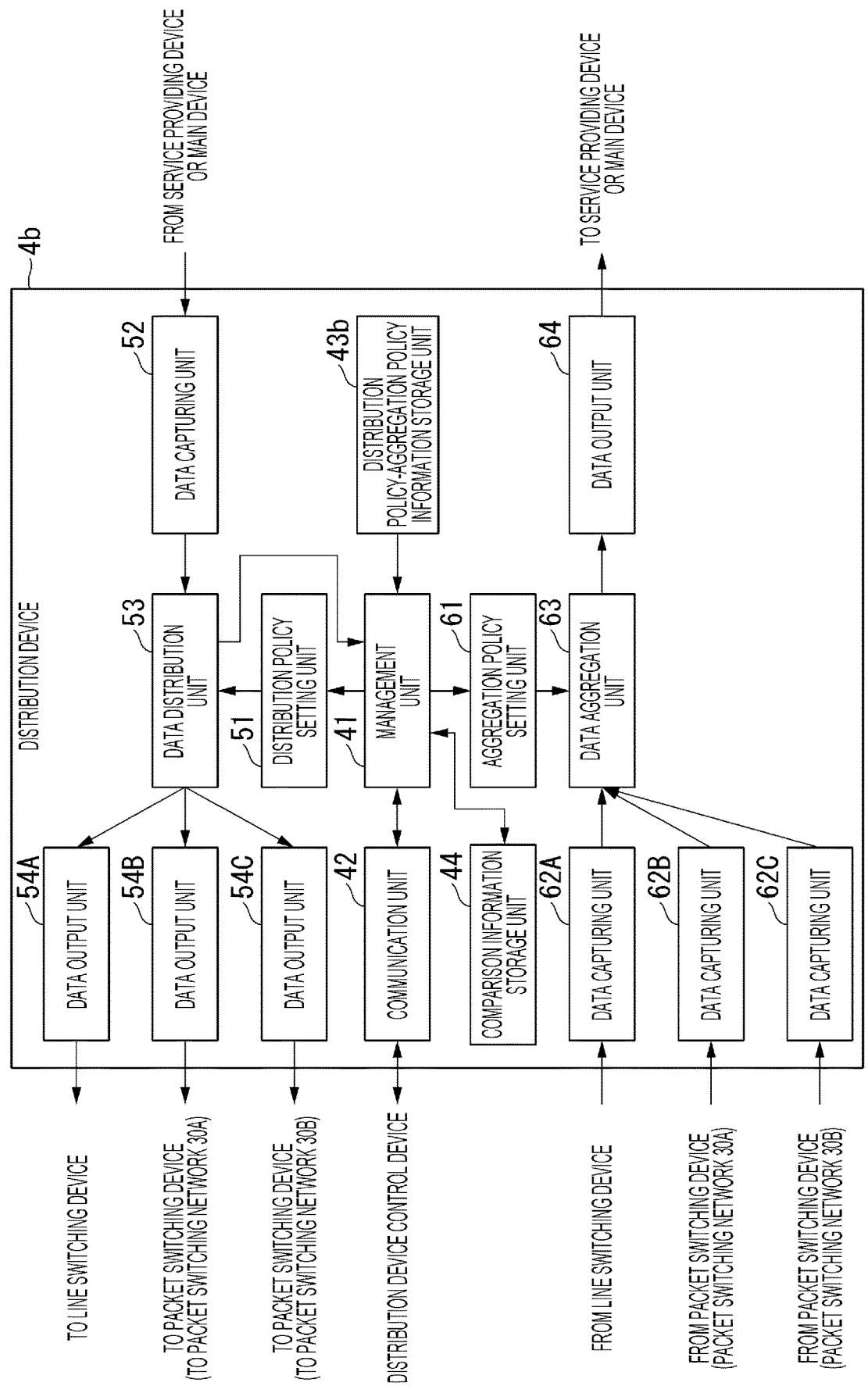
FIG. 14 is a block diagram illustrating an internal configuration of a distribution device of the third embodiment.

Note that, in the distribution device 4c, by further adding another filtering device, the distribution device 4c can also be applied to the third embodiment by replacing the distribution device 4b illustrated in FIG. 14.

In addition, each of the filtering devices 4-sub-A and 4-sub-B of the distribution device 4c may include a communication unit that communicates with the distribution device control device 2, the distribution device control device 2 may further include a distribution policy-aggregation policy information storage unit 43 included in the distribution device 4c, and the distribution device control device 2 may write and set the distribution policy information corresponding to each of the data filtering units 54Ac and 54Bc in the internal storage area of each of the data filtering units 54Ac and 54Bc.

In the distribution device 4 illustrated in FIG. 3, the distribution device 4b illustrated in FIG. 14, and the distribution device 4c illustrated in FIG. 21, the main devices 7-1 and 7-2 of the calculation devices 6-1 and 6-2 may include functional units related to aggregation of data. Here, the functional units related to data aggregation are the data aggregation unit 63, the data capturing units 62A and 62B, and the data output unit 64 in cases of the distribution devices 4 and 4c, and are the data aggregation unit 63, the data capturing units 62A, 62B, and 62C, and the data output unit 64 in a case of the distribution device 4b. The aggregation policy setting unit 61 may be included as a functional unit related to data aggregation.

All the configurations of the distribution device 4 and the distribution device 4b and the configuration of the distribution main device 4-main of the distribution device 4c may be provided in the main devices 7-1 and 7-2 of the calculation devices 6-1 and 6-2.

(Another Configuration Example of Communication System)

Figure 22:
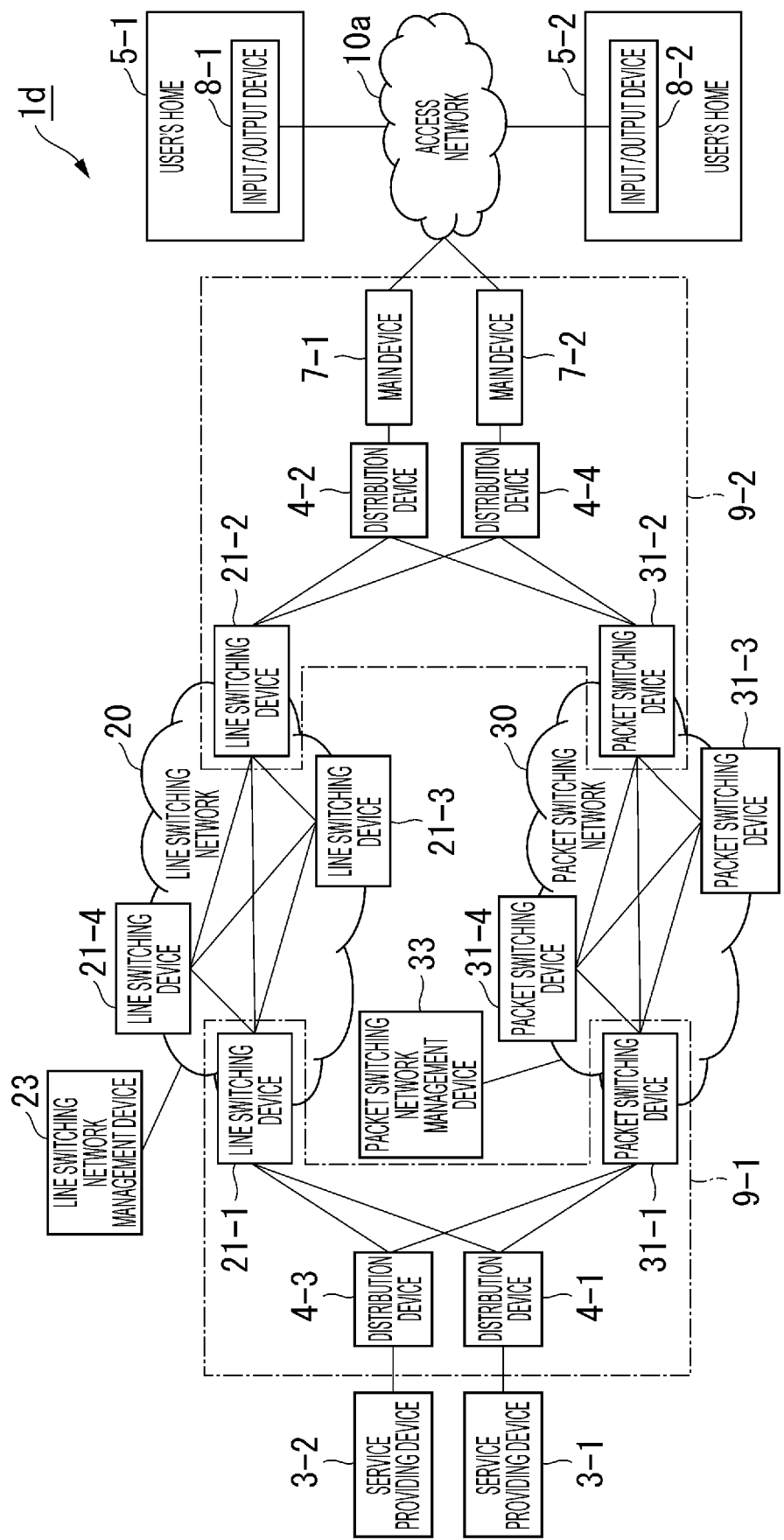
FIG. 22 is a block diagram illustrating another configuration example of the communication system of the second embodiment.

In the first to third embodiments described above, one distribution device 4-1, 4-2, 4b-1, or 4b-2 is installed in each of the bases 9-1 and 9-2, but a plurality of distribution devices 4 and 4b or the distribution device 4c described above may be provided in one base. For example, FIG. 22 is a diagram illustrating a configuration of a communication system 1d in which two distribution devices 4-1 and 4-3 are installed in the base 9-1 and two distribution devices 4-2 and 4-4 are installed in the base 9-2 in the second embodiment. The distribution devices 4-3 and 4-4 have the same configuration as the distribution devices 4-1 and 4-2. Service providing devices 3-1 and 3-2 included in the communication system 1d have the same configuration as the service providing device 3 of the first to third embodiments, and are connected to the distribution devices 4-1 and 4-3, respectively. The main devices 7-1 and 7-2 are connected to the distribution devices 4-2 and 4-4, respectively. Consequently, since one of the distribution devices 4-1 to 4-4 can be applied to each of the service providing devices 3-1 and 3-2 and each of the main devices 7-1 and 7-2, it is possible to reduce the processing load of the distribution devices 4-1 to 4-4 per one. Note that, in the communication system 1d illustrated in FIG. 22, in order to avoid complication of the drawing, the distribution device control device 2 and the control lines connected to the distribution device control device 2 are omitted, but similarly to the communication systems 1, 1a, and 1b, the communication system 1d includes the distribution device control device 2, and the distribution device control device 2 is connected to each of the line switching network management device 23, the packet switching network management device 33, and the distribution devices 4-1 to 4-4 by control lines.

(Optical Burst Transfer in Line Switching Network)

The line switching devices 21-1 to 21-4 provided in the line switching network 20 may perform optical burst transfer as described in Non Patent Literature 2. The line switching devices 21-1 to 21-4 collectively transmit data in the same transmission direction by the optical burst transfer, so that the communication speed can be improved. For example, as supplementarily described in the first embodiment, in the line switching network 20, it is assumed that one line is generated for two transmission destination addresses of the address information added in advance to the main device 7-1 and the address information added in advance to the main device 7-2. In this case, the line switching device 21-1 collectively performs the optical burst transfer of the data transmitted from the service providing device 3 to the main device 7-1 and the main device 7-2 through the generated line to the line switching device 21-2 by high-frequency optical switching. In the line switching device 21-2, the data transferred in the optical burst transfer by the line switching device 21-1 is separated into data whose transmission destination is the main device 7-1 and data whose transmission destination is the main device 7-2 and transmitted to the distribution device 4-2. Consequently, it is possible to shorten the time required for transferring data between the line switching device 21-1 and the line switching device 21-2.

(Regarding Data Transmission by Multicast)

Figure 23:
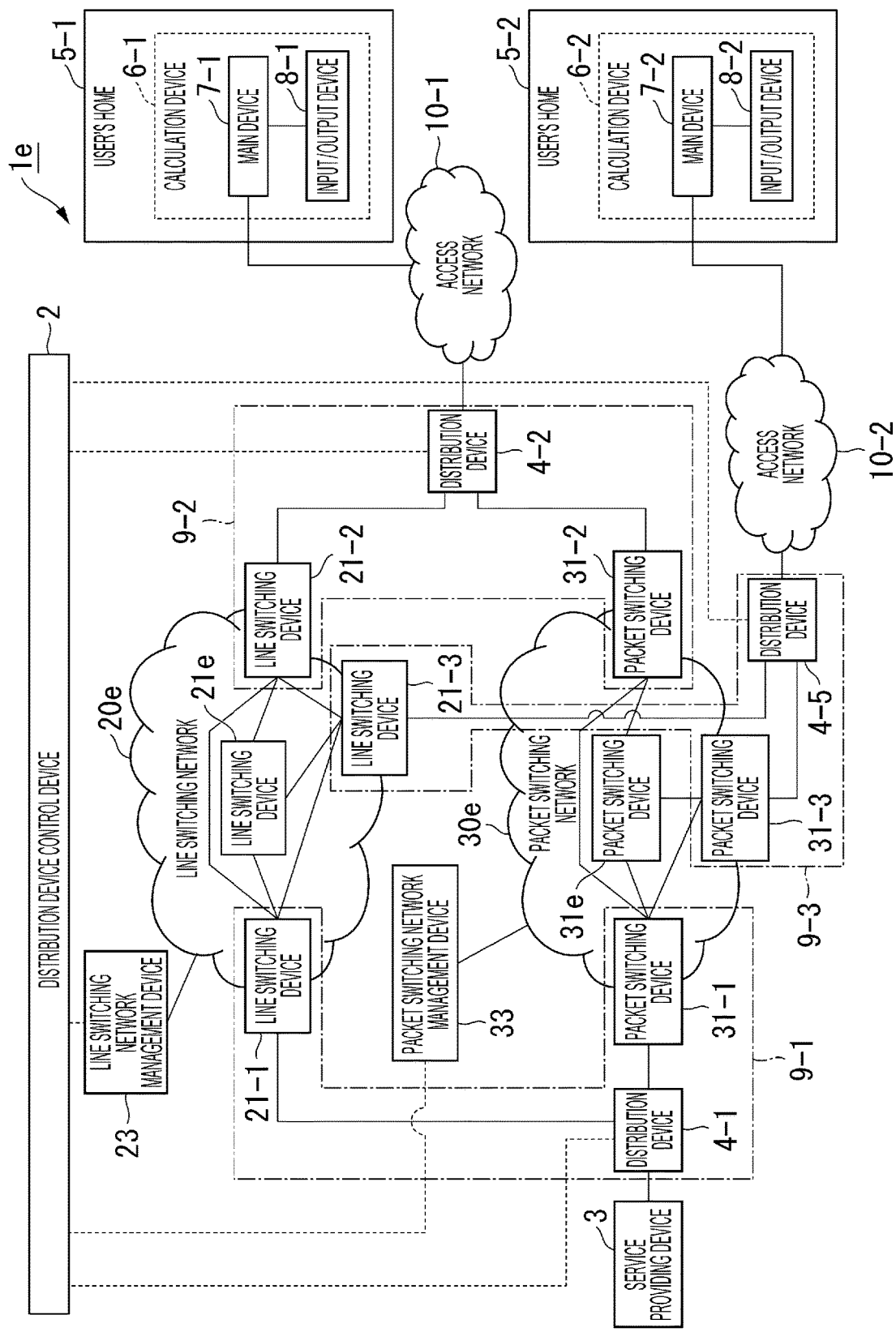
FIG. 23 is a block diagram illustrating another configuration example of the communication system of the first embodiment.
Figure 24:
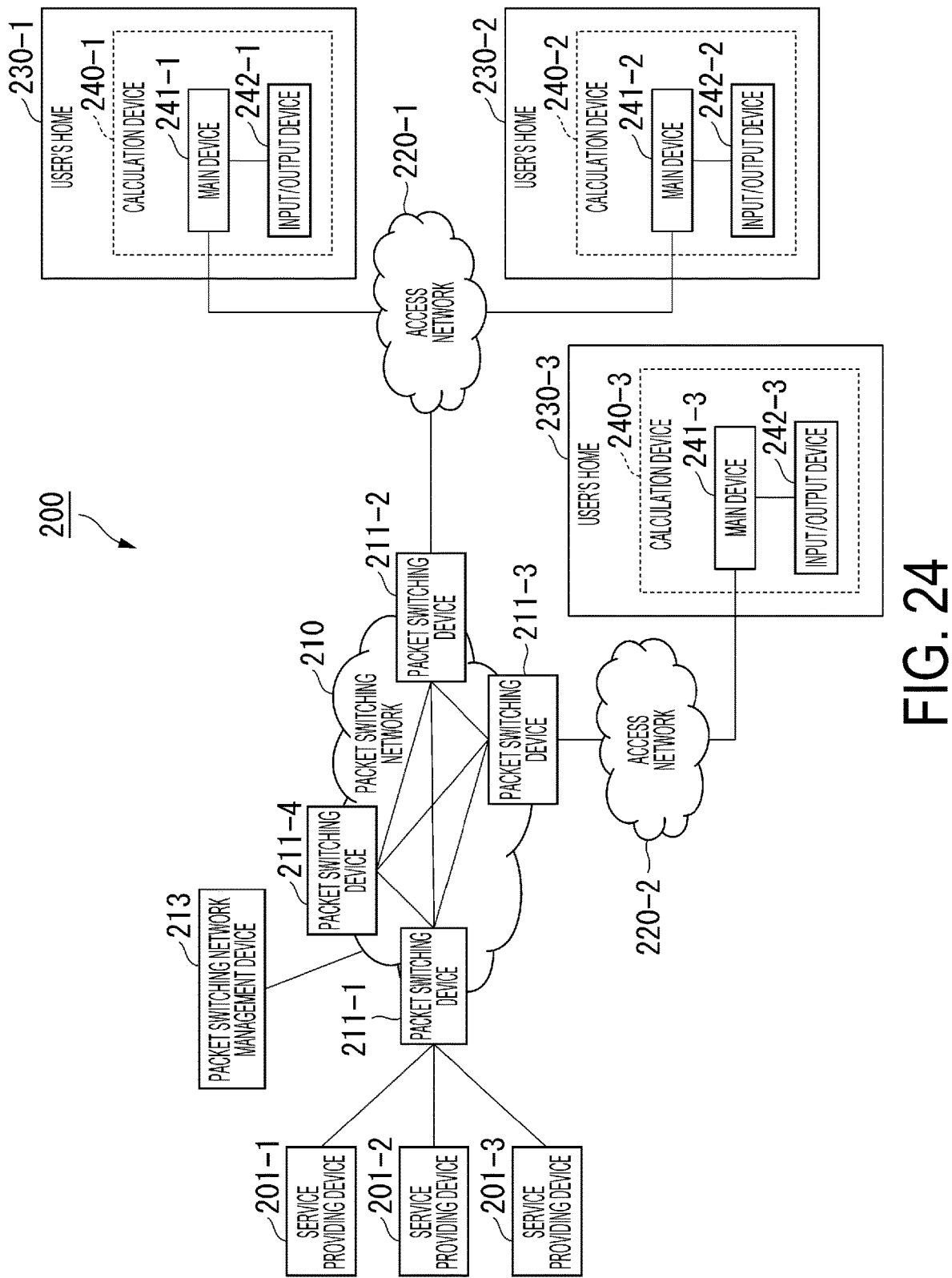
FIG. 24 is a block diagram illustrating a configuration of a general communication system including a packet switching network.
Figure 25:
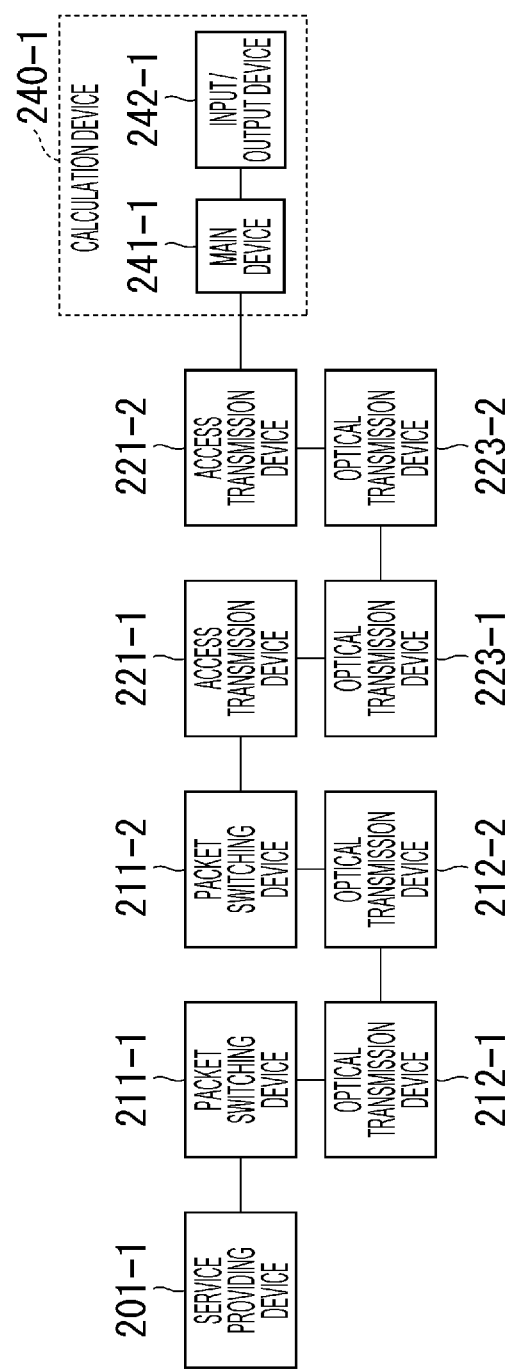
FIG. 25 is a block diagram illustrating a connection configuration of the communication system in FIG. 24.

The line switching network 20 and the packet switching network 30 may transfer data by a multicast method. An example of data transfer by the multicast method will be described with reference to a communication system 1e which is another configuration example of the communication system 1 of the first embodiment illustrated in FIG. 23.

In the communication system 1e, the same components as those of the communication system 1 of the first embodiment are denoted by the same reference numerals. The communication system 1e includes the distribution device control device 2, the service providing device 3, distribution devices 4-1, 4-2, and 4-5, the calculation devices 6-1 and 6-2, access networks 10-1 and 10-2, a line switching network 20e, and a packet switching network 30e.

The calculation device 6-1 installed in the user's home 5-1 is connected to the distribution device 4-2 via the access network 10-1. The calculation device 6-2 installed in the user's home 5-2 is connected to the distribution device 4-5 via the access network 10-2. The access networks 10-1 and 10-2 have the same configuration as the access network 10 of the communication system 1.

The line switching network 20e includes the line switching devices 21-1 to 21-3, the line switching network management device 23, and a line switching device 21e. Similarly to the first embodiment, optical transmission devices such as the optical transmission devices 22-1 to 22-2 are connected to each of the line switching devices 21-1 to 21-3 and the line switching device 21e, and each optical transmission device is connected by an optical fiber. Each of the line switching devices 21-1 to 21-3 and the line switching device 21e can generate individual lines connected to each other through an optical fiber. The line switching device 21e is the line switching device for relay supplementarily described in the first embodiment.

The packet switching network 30e includes the packet switching devices 31-1 to 31-3, the packet switching network management device 33, and a packet switching device 31e. Similarly to the first embodiment, optical transmission devices such as the optical transmission devices 32-1 to 32-2 are connected to the packet switching devices 31-1 to 31-3 and the packet switching device 31e. Each optical transmission device is connected by an optical fiber, and an optical path is set. The packet switching device 31e is the packet switching device for relay supplementarily described in the first embodiment, and is connected to each of the packet switching devices 31-1 to 31-3 via an optical path.

The distribution device 4-5 has the same configuration as the distribution devices 4-1 and 4-2. The distribution device 4-5 is installed in the same base 9-3 as the line switching device 21-3 and the packet switching device 31-3, and is connected to the line switching device 21-3 and the packet switching device 31-3.

For example, it is assumed that both the users of the calculation devices 6-1 and 6-2 request reception of data transmitted by the service providing device 3, and the service providing device 3 acquires the address information of the calculation devices 6-1 and 6-2, that is, the address information added to the main devices 7-1 and 7-2 in advance. It is assumed that the service providing device 3 designates transmission of data by multicast and transmits data to which address information of the calculation devices 6-1 and 6-2 is added as a transmission destination address to the distribution device 4-1.

(Multicast by Line Switching Network)

It is assumed that the data distribution unit 53-1 of the distribution device 4-1 selects transfer of data via the line switching network 20e on the basis of distribution policy information stored in the internal storage area. The management unit 41-1 of the distribution device 4-1 transmits, to the distribution device control device 2 via the communication unit 42-1, a multicast request signal including an indication to transmit data to the address information of the calculation devices 6-1 and 6-2 by multicast and the line switching device identification information of the line switching device 21-1 to which the distribution device 4-1 is connected.

Upon receiving the multicast connection request signal from the distribution device 4-1, the distribution device control device 2 transmits and receives the information request signal and the information response signal to and from the line switching network management device 23, and further performs determination of line setting possibility, and then transmits the line setting request signal to the line switching network management device 23. The line switching network management device 23 performs the processing of housing design, and the line switching network management device 23 generates individual lines for multicast between the line switching device 21-1 and the line switching device 21e for relay. The line switching network management device 23 further generates individual lines for multicast between the line switching device 21e and the line switching devices 21-2 and 21-3.

Upon receiving the data from the distribution device 4-1, the line switching device 21-1 transmits the received data to the line switching device 21e for relay through the individual lines for multicast. Upon receiving data from the line switching device 21-1 through the individual lines for multicast, the line switching device 21e for relay duplicates the received data into two pieces of data, and transmits each of the two pieces of duplicated data through the individual lines for multicast with the line switching device 21-2 and the line switching device 21-3. The calculation device 6-1 receives the data via the line switching device 21-2, the distribution device 4-2, and the access network 10-1. The calculation device 6-2 receives the data via the line switching device 21-3, the distribution device 4-5, and the access network 10-2.

As described above, in the multicast method, one individual line is generated between the line switching device 21-1 and the line switching device 21e for relay, and one individual line is generated between the line switching device 21e for relay and each of the line switching devices 21-2 and 21-3. On the other hand, in the unicast method, an individual line is generated between the line switching device 21-1 and each of the line switching devices 21-2 and 21-3. Therefore, in a case of the multicast method, the traffic sent out by the line switching device 21-1 is half the traffic in a case of the unicast method. Thus, in the multicast method, consumption of resources in the line switching network 20e can be suppressed, and data transmitted by the service providing device 3 can be transmitted to the calculation devices 6-1 and 6-2.

Note that the line switching device 21-1 may duplicate data and transmit the duplicated data to the line switching devices 21-2 and 21-3. In this case, the service providing device 3 can transmit data to the plurality of main devices 7-1 and 7-2 only by transmitting one piece of data. In addition, in a case where a plurality of calculation devices other than the calculation device 6-1 is connected to the distribution device 4-2 and a plurality of calculation devices other than the calculation device 6-2 is connected to the distribution device 4-5, when data is transmitted to the plurality of calculation devices other than the calculation devices 6-1 and 6-2 by multicast, the distribution devices 4-2 and 4-5 may duplicate the data and transmit the data.

(Multicast by Packet Switching Network)

It is assumed that the data distribution unit 53-1 of the distribution device 4-1 selects to transfer data via the packet switching network 30e on the basis of the distribution policy information stored in the internal storage area. The management unit 41-1 of the distribution device 4-1 transmits, to the distribution device control device 2 via the communication unit 42-1, a multicast connection request signal including an indication to transmit data to the address information of the calculation devices 6-1 and 6-2 by multicast and the packet switching device identification information of the packet switching device 31-1 to which the distribution device 4-1 is connected. Upon receiving the multicast connection request signal from the distribution device 4-1, the distribution device control device 2 transmits and receives the information request signal and the information response signal to and from the packet switching network management device 33, and requests the packet switching network management device 33 for generating route information for multicast leading to the packet switching device 31-2 to which the calculation device 6-1 is indirectly connected and the packet switching device 31-3 to which the calculation device 6-2 is indirectly connected, with the packet switching device 31-1 as a starting point of data transmission.

Upon receiving the request for generation of the route information for multicast leading to the packet switching devices 31-2 and 31-3 from the distribution device control device 2 with the packet switching device 31-1 as the starting point of data transmission, the packet switching network management device 33 generates the route information according to the request. The packet switching network management device 33 transmits the generated route information to the packet switching devices 31-1 to 31-3 and the packet switching device 31e for setting.

Upon receiving data transmitted by the distribution device 4-1, the packet switching device 31-1 converts the received data into a packet, and then transmits the packet to the packet switching device 31e for relay according to the route information for multicast. Upon receiving the packet from the packet switching device 31-1, the packet switching device 31e for relay duplicates the received packet into two packets, and transmits each of the two duplicated packets to the packet switching devices 31-2 and 31-3 according to the route information for multicast. The packet switching device 31-2 restores data from the packet received from the packet switching device 31e for relay, and transmits the restored data to the calculation device 6-1 via the distribution device 4-2 and the access network 10-1. The packet switching device 31-3 restores data from the packet received from the packet switching device 31e for relay, and transmits the restored data to the calculation device 6-2 via the distribution device 4-5 and the access network 10-2.

Consequently, the packet switching device 31-1 only needs to transmit one packet without transmitting two packets to each of the packet switching devices 31-2 and 31-3, and it is possible to transmit data transmitted by the service providing device 3 to the calculation devices 6-1 and 6-2 while suppressing consumption of resources in the packet switching network 30e.

For example, it is assumed that the service providing device 3 performs a service for transmitting a software installation program, and the users of the calculation devices 6-1 and 6-2 are target persons of the service. In this case, the use of the multicast method enables the service providing device 3 to simultaneously transmit the installation programs to the calculation devices 6-1 and 6-2 at the release timing of software while saving resources in the line switching network 20*e* and the packet switching network 30*e*.

Note that, here, an example of data transfer by the multicast method has been described with reference to the communication system 1*e* which is another configuration example of the communication system 1 of the first embodiment, but the multicast method can be similarly applied to the communication systems 1*a* and 1*b* of the second and third embodiments.

For the above multicast method by the packet switching network 30*e*, an outline has been described in which the distribution devices 4-1 and 4-2, the distribution device control device 2, and the packet switching network management device 33 cooperate to set the route information for multicast to the packet switching devices 31-1 to 31-3 and the packet switching device 31*e*, but data transmission by multicast may be performed by what is called an IP multicast method.

The distribution devices 4, 4*b*, and 4*c* and the distribution device control device 2 in the above-described embodiments may be implemented by a computer. In that case, the program for achieving these functions may be recorded in a computer-readable recording medium, and the program recorded in the recording medium may be read and executed by a computer system to achieve the functions. Note that the "computer system" mentioned herein includes hardware such as an OS and peripheral devices. Also, the "computer-readable recording medium" refers to a portable medium such as a flexible disk, a magneto-optical disk, a ROM, or a CD-ROM, or a storage device such as a hard disk included in a computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the above program may be for achieving some of the functions described above, may be formed with a combination of the functions described above and a program already recorded in a computer system, or may be formed with a programmable logic device such as a field programmable gate array (FPGA).

Although embodiments of the present invention have been described in detail with reference to the drawings so far, specific configurations are not limited to these embodiments, and include designs and the like without departing from the spirit of the present invention.

INDUSTRIAL APPLICABILITY

The present invention can be applied in a communication system such as the Internet.

REFERENCE SIGNS LIST

1 Communication system
2 Distribution device control device
3 Service providing device
4-1, 4-2 Distribution device
5-1, 5-2 User's home
6-1, 6-2 Calculation device
7-1, 7-2 Main device
8-1, 8-2 Input/output device
9-1, 9-2 Base
10 Access network
20 Line switching network
21-1 to 21-4 Line switching device
23 Line switching network management device
31-1 to 31-4 Packet switching device
33 Packet switching network management device

The invention claimed is:

1. A communication system, comprising:
a service providing device configured to provide a service to a user;
a calculation device having at least a communication function and an arithmetic processing function; and
a plurality of distribution devices connected to a single or a plurality of line switching networks that transfers data received through a line generated corresponding to a transmission destination of data and a single or a plurality of packet switching networks that transfers data through a route corresponding to the transmission destination of data among a plurality of routes, each of the distribution devices selecting one of the line switching network or the packet switching network as a distribution destination on a basis of distribution policy information in a case where data to which the service providing device or the calculation device is set as a transmission destination is received, transmitting the received data to the selected switching network, capturing the received data on a basis of aggregation policy information in a case where the data transmitted by another one of the distribution devices is received from the line switching network or the packet switching network, and transmitting the captured data to the service providing device or the calculation device corresponding to a transmission destination of the captured data, wherein the aggregation policy information indicates an aggregation policy for (i) time division reception, in which a receiving destination is switched in time, (ii) simultaneous reception, in which data is received from multiple destinations simultaneously, or (iii) selective reception, in which the receiving destination is selectively switched according to priority.

2. The communication system according to claim 1, further comprising an access network, wherein
the calculation device is configured to be connected to one of the distribution devices via the access network, and/or the calculation device includes a main device configured to receive the data and an input/output device, the main device is configured to be directly connected to one of the distribution devices, and the input/output device is connected to the main device via the access network.

3. The communication system according to claim 1, comprising:
a distribution device control device connected to the distribution devices, a line switching network management device included in the line switching network, and a packet switching network management device included in the packet switching network, wherein:
each of the distribution devices
transmits a signal requesting for information specifying a distribution destination to the distribution device control device in a case where the switching network of the distribution destination is not selectable on the basis of the distribution policy information, receives the information specifying the distribution destination from the distribution device control device, and selects the switching network of the distribution destination, and the distribution device control device
transmits information obtained from the line switching network management device or the packet switching network management device to the distribution device as information for specifying the distribution destination in a case where a signal for requesting the information for specifying the distribution destination is received from the distribution device.

4. The communication system according to claim 1, wherein the line switching network includes a plurality of line switching devices, and
in a case where a line is generated between two of the line switching devices and one of the two line switching devices receives a plurality of pieces of the data to be transmitted to the other line switching device, the one of the line switching devices collectively performs optical burst transfer of the received plurality of pieces of the data to the other line switching device through the line between the two line switching devices.

5. The communication system according to claim 1, wherein
in a case where the service providing device receives data to be transmitted by designating multicast, the service providing device duplicates the data such that a number of pieces of the data is equal to a number of a plurality of the calculation devices requesting reception of the data in the packet switching network, or the line switching network, or the distribution device, and transmits the duplicated data to each of the plurality of calculation devices.

6. A distribution device provided in a communication system that includes:
a single or a plurality of line switching networks that transfers data received through a line generated corresponding to a transmission destination of data and a single or a plurality of packet switching networks that transfers data through a route corresponding to the transmission destination of data among a plurality of routes;
a service providing device that provides a service to a user; and
a calculation device having at least a communication function and an arithmetic processing function, wherein
the distribution device selects one of the line switching network or the packet switching network as a distribution destination on a basis of distribution policy information in a case of connecting to the line switching network and the packet switching network and receiving data to which the service providing device or the calculation device is set as a transmission destination, transmits the received data to the selected switching network, captures the received data on a basis of aggregation policy information in a case where the data transmitted by another one of the distribution devices is received from the line switching network or the packet switching network, and transmits the captured data to the service providing device or the calculation device corresponding to a transmission destination of the captured data, wherein the aggregation policy information indicates an aggregation policy for (i) time division reception, in which a receiving destination is switched in time, (ii) simultaneous reception, in which data is received from multiple destinations simultaneously, or (iii) selective reception, in which the receiving destination is selectively switched according to priority.

7. A data distribution method, comprising:
by a first distribution device, in a case of receiving data to which a service providing device that provides a service to a user or a calculation device having at least a communication function and an arithmetic processing function is set as a transmission destination, selecting, as a distribution destination, a single or a plurality of line switching networks or a single or a plurality of packet switching networks on a basis of distribution policy information, and transmitting the received data to the selected switching network;
transferring, in a case where the data is received from the first distribution device in the line switching network, the received data through a line generated corresponding to the transmission destination of the data;
transferring, in a case where the data is received from the first distribution device in the packet switching network, the received data through a route corresponding to the transmission destination of the data among a plurality of routes; and
by a second distribution device, in a case of receiving the data transmitted by the first distribution device from the line switching network or the packet switching network, capturing the received data on a basis of aggregation policy information, and transmitting the captured data to the service providing device or the calculation device corresponding to the transmission destination of the captured data, wherein the aggregation policy information indicates an aggregation policy for (i) time division reception, in which a receiving destination is switched in time, (ii) simultaneous reception, in which data is received from multiple destinations simultaneously, or (iii) selective reception, in which the receiving destination is selectively switched according to priority.

* * * * *